US012657252B2

(12) United States Patent (10) Patent No.: US 12,657,252 B2
Mancuso et al. (45) Date of Patent: Jun. 16, 2026

(54) CONTENT CREATIVE WEB BROWSER

(71) Applicant: Dropbox, Inc., San Francisco, CA (US)

(72) Inventors: Devin Mancuso, San Francisco, CA (US); Christopher Meeks, Austin, TX (US); Benjamin Joseph Calabrese, Portland, OR (US)

(73) Assignee: Dropbox, Inc., San Francisco, CA (US)

( * ) Notice: Subject to any disclaimer, the term of this patent is extended or adjusted under 35 U.S.C. 154(b) by 90 days.

(21) Appl. No.: 18/443,063

(22) Filed: Feb. 15, 2024

(65) Prior Publication Data

US 2024/0184841 A1 Jun. 6, 2024

Related U.S. Application Data

(63) Continuation of application No. 17/664,097, filed on May 19, 2022, now Pat. No. 11,921,812.

(51) Int. Cl.
G06F 3/0482 (2013.01)
G06F 16/958 (2019.01)
(52) U.S. Cl.
CPC .......... G06F 16/958 (2019.01); G06F 3/0482 (2013.01)
(58) Field of Classification Search
CPC .............................. G06F 16/958; G06F 3/0482
See application file for complete search history.

(56) References Cited

U.S. PATENT DOCUMENTS 6,898,601 B2 5/2005 Amado et al.
7,117,271 B2 10/2006 Haverstock et al.

7,433,885 B2 10/2008 Jones
7,788,592 B2 8/2010 Williams et al.
8,296,656 B2 10/2012 Dowdy et al.
8,407,576 B1 3/2013 Yin et al.
8,612,888 B2 12/2013 Pennington et al.
8,677,234 B2 3/2014 Underwood et al.
9,003,315 B2 4/2015 Behar et al.
9,112,936 B1 8/2015 Poletto et al.
9,285,958 B1 * 3/2016 Hill ...................... G06F 16/954
9,438,467 B1 9/2016 Kembel et al.

(Continued)

FOREIGN PATENT DOCUMENTS

CN 106164856 A 11/2016
WO 2019209391 A1 10/2019

OTHER PUBLICATIONS

Predicting Web Actions from HTML Content (Year: 2002).*

(Continued)

*Primary Examiner* — Anil K Bhargava
(74) *Attorney, Agent, or Firm* — Keller Preece PLLC

(57) ABSTRACT

The present disclosure is directed toward systems, methods, and non-transitory computer readable media for providing a creativity web browser for content creation that integrates features of a content management system with internet browsing capabilities. Specifically, the disclosed systems provide a creativity web browser that includes specialized interface elements for restructuring web browsing to focus on content-related context, including a digital canvas, a content collection pane, an x-ray pane, and other elements. The disclosed systems can provide access to browsing across multiple systems or platforms, such as internet locations and/or locations within a content management system, within an integrated web browsing environment.

20 Claims, 17 Drawing Sheets

(56) References Cited

U.S. PATENT DOCUMENTS

| | | | |
|---|---|---|---|
| 9,542,060 B1 | 1/2017 | Brenner et al. | |
| 9,602,559 B1 | 3/2017 | Barros et al. | |
| 9,654,598 B1 | 5/2017 | Crawford et al. | |
| 9,710,556 B2 | 7/2017 | Koperski et al. | |
| 9,769,008 B1 | 9/2017 | Petts et al. | |
| 9,817,562 B2 | 11/2017 | Keel et al. | |
| 9,864,813 B2 | 1/2018 | Melton et al. | |
| 9,876,776 B2 | 1/2018 | Scoda | |
| 9,898,578 B2 | 2/2018 | Yakhini et al. | |
| 9,952,748 B1 | 4/2018 | Lewis et al. | |
| 10,324,973 B2 | 6/2019 | Circlaeys et al. | |
| 10,345,987 B1 | 7/2019 | Andreou | |
| 10,387,514 B1 | 8/2019 | Yang et al. | |
| 10,540,059 B2 | 1/2020 | LaPier et al. | |
| 10,547,570 B2 | 1/2020 | Sirpal et al. | |
| 10,628,392 B1 | 4/2020 | Charytoniuk et al. | |
| 10,693,819 B1 | 6/2020 | Boyd et al. | |
| 10,739,932 B2 | 8/2020 | Holliday | |
| 10,872,062 B2 | 12/2020 | Truong et al. | |
| 10,922,426 B2 | 2/2021 | Broussard et al. | |
| 10,970,329 B1 | 4/2021 | Al Majid et al. | |
| 11,126,792 B2 | 9/2021 | Hance et al. | |
| 11,169,675 B1 | 11/2021 | Anvaripour et al. | |
| 11,334,768 B1 | 5/2022 | Brody | |
| 11,386,116 B2 | 7/2022 | Kleinpeter et al. | |
| 11,388,567 B1 | 7/2022 | McCracken, Jr. et al. | |
| 2004/0155888 A1 | 8/2004 | Padgitt et al. | |
| 2004/0158555 A1 | 8/2004 | Seedman et al. | |
| 2005/0091596 A1 | 4/2005 | Anthony et al. | |
| 2005/0132296 A1 | 6/2005 | Milic-Frayling et al. | |
| 2005/0144190 A1 | 6/2005 | Wada | |
| 2007/0136656 A1 | 6/2007 | Nydam et al. | |
| 2007/0143341 A1 | 6/2007 | Brownell et al. | |
| 2008/0004946 A1 | 1/2008 | Schwarz | |
| 2008/0010319 A1 | 1/2008 | Vonarburg et al. | |
| 2009/0249244 A1 | 10/2009 | Robinson et al. | |
| 2009/0300511 A1 | 12/2009 | Behar et al. | |
| 2009/0303676 A1 | 12/2009 | Behar et al. | |
| 2009/0322790 A1 | 12/2009 | Behar et al. | |
| 2010/0087209 A1 | 4/2010 | Holm et al. | |
| 2010/0095240 A1 | 4/2010 | Shiplacoff et al. | |
| 2010/0169802 A1* | 7/2010 | Goldstein | G06F 16/958 |
| | | | 707/802 |
| 2010/0174993 A1 | 7/2010 | Pennington et al. | |
| 2010/0198768 A1* | 8/2010 | Zhou | G06F 9/453 |
| | | | 715/812 |
| 2011/0040754 A1 | 2/2011 | Peto et al. | |
| 2012/0110515 A1 | 5/2012 | Abramoff et al. | |
| 2013/0018960 A1 | 1/2013 | Knysz et al. | |
| 2013/0057587 A1 | 3/2013 | Leonard et al. | |
| 2013/0080956 A1 | 3/2013 | Sirpal et al. | |
| 2014/0053099 A1* | 2/2014 | Groten | G01C 21/3647 |
| | | | 715/790 |
| 2014/0101592 A1 | 4/2014 | Costa et al. | |
| 2014/0108939 A1 | 4/2014 | Mahapatra et al. | |
| 2014/0164404 A1 | 6/2014 | Hunt et al. | |
| 2014/0172808 A1 | 6/2014 | Burge | |
| 2014/0181130 A1 | 6/2014 | Davis et al. | |
| 2014/0195516 A1 | 7/2014 | Balakrishnan et al. | |
| 2014/0289611 A1 | 9/2014 | Norwood et al. | |
| 2014/0324913 A1 | 10/2014 | Morris et al. | |
| 2015/0121534 A1 | 4/2015 | Zhao et al. | |
| 2015/0149329 A1 | 5/2015 | Tam et al. | |
| 2015/0149504 A1 | 5/2015 | Sosna et al. | |
| 2016/0034437 A1 | 2/2016 | Yong et al. | |
| 2016/0057500 A1 | 2/2016 | Berson et al. | |
| 2016/0077673 A1 | 3/2016 | Nagaralu et al. | |
| 2016/0154974 A1* | 6/2016 | Kisnisci | G06F 16/9535 |
| | | | 726/28 |
| 2016/0188155 A1 | 6/2016 | Hunt et al. | |
| 2016/0205163 A1 | 7/2016 | Patel | |
| 2016/0231973 A1 | 8/2016 | Sirpal et al. | |
| 2016/0234140 A1 | 8/2016 | Sirpal et al. | |
| 2016/0284112 A1 | 9/2016 | Greenberg et al. | |
| 2017/0052926 A1 | 2/2017 | Viveiros et al. | |
| 2017/0090699 A1 | 3/2017 | Pennington et al. | |
| 2017/0140285 A1 | 5/2017 | Dotan-Cohen et al. | |
| 2017/0214975 A1 | 7/2017 | Schmidt et al. | |
| 2017/0329859 A1 | 11/2017 | Ploeg et al. | |
| 2018/0025003 A1 | 1/2018 | Marriott et al. | |
| 2018/0046470 A1 | 2/2018 | De Oliveira et al. | |
| 2018/0088749 A1 | 3/2018 | Yamashita et al. | |
| 2018/0113579 A1 | 4/2018 | Johnston et al. | |
| 2018/0189369 A1 | 7/2018 | Baek et al. | |
| 2018/0239500 A1 | 8/2018 | Allen et al. | |
| 2019/0102364 A1 | 4/2019 | Rochiramani et al. | |
| 2019/0102372 A1 | 4/2019 | Hailpern et al. | |
| 2019/0163766 A1 | 5/2019 | Gulati et al. | |
| 2019/0163768 A1 | 5/2019 | Gulati et al. | |
| 2019/0208257 A1 | 7/2019 | Hsiao | |
| 2019/0332710 A1 | 10/2019 | Wei et al. | |
| 2019/0340658 A1* | 11/2019 | Udupa | G06Q 30/0239 |
| 2020/0097464 A1 | 3/2020 | Subramaniam et al. | |
| 2020/0143102 A1 | 5/2020 | Ziraknejad et al. | |
| 2020/0150935 A1 | 5/2020 | Bucur et al. | |
| 2020/0159871 A1 | 5/2020 | Bowen | |
| 2020/0233878 A1 | 7/2020 | Huang et al. | |
| 2020/0351314 A1 | 11/2020 | Butcher et al. | |
| 2021/0034659 A1 | 2/2021 | Zimmerman et al. | |
| 2021/0048928 A1 | 2/2021 | Phan et al. | |
| 2021/0110105 A1 | 4/2021 | Smajic et al. | |
| 2021/0224246 A1 | 7/2021 | Soini et al. | |
| 2021/0367914 A1 | 11/2021 | Collins et al. | |
| 2021/0382585 A1 | 12/2021 | Collins et al. | |
| 2021/0409357 A1 | 12/2021 | Brody et al. | |
| 2022/0083523 A1 | 3/2022 | Ben-Aharon et al. | |
| 2022/0155924 A1 | 5/2022 | Campbell et al. | |
| 2022/0197961 A1 | 6/2022 | Baek et al. | |
| 2022/0207840 A1 | 6/2022 | Cansizoglu et al. | |
| 2022/0221965 A1 | 7/2022 | Golan et al. | |
| 2022/0319082 A1 | 10/2022 | Boyd et al. | |
| 2023/0050882 A1* | 2/2023 | Shalai | G06F 16/9574 |

OTHER PUBLICATIONS

Final Office Action from U.S. Appl. No. 17/664,097, mailed Aug. 3, 2023, 19 pages.
Final Office Action from U.S. Appl. No. 17/664,097, mailed Dec. 13, 2022, 22 pages.
Non-Final Office Action from U.S. Appl. No. 17/664,097, mailed Apr. 27, 2023, 18 pages.
Non-Final Office Action from U.S. Appl. No. 17/664,097, mailed Jul. 22, 2022, 23 pages.
Notice of Allowance from U.S. Appl. No. 17/664,097, mailed Nov. 1, 2023, 09 pages.
Kongyang Z., "Research on virtual scene network roaming based on WebGL," Geomatics & Spatial Information Technology, Dec. 25, 2015, No. 12. <URL: https://qikan.cqvip.com/Qikan/Article/Detail?id=7104730848>.
Notice of Allowance for Chinese Application No. 202310537765.8 mailed on Dec. 23, 2025, 5 pages.

* cited by examiner

1500

1510

Generating A Web Browser Interface Including A Digital Canvas

1520

Providing A Content Collection Pane Within The Web Browser Interface

1530

Receiving A Selection Of A Content Collection From The Content Collection Pane

1540

Accessing Content Items From Content Management System

1550

Providing Content Item(s) For Display Within The Digital Canvas

1612

1700

CONTENT CREATIVE WEB BROWSER

RELATED APPLICATIONS

This application is a continuation of U.S. patent application Ser. No. 17/664,097, filed on May 19, 2022. The aforementioned application is hereby incorporated by reference in its entirety.

BACKGROUND

Over the years, developments in computing and networking technology have led to myriad innovations in web browsing, such as integration of third-party applications (e.g., through extensions or plugins) and improved access to a variety of digital content, including videos, music, and other web-based content. For example, many existing web browsing systems provide web browsers that can facilitate navigating many different websites at once (e.g., in separate tabs), each website including its own web content displayable or otherwise consumable via a client device. Despite these advances, however, existing web browsing systems continue to suffer from a number of disadvantages, particularly in terms of flexibility and efficiency.

As just suggested, some existing web browsing systems are inflexible. Specifically, most existing systems rigidly adhere to the longstanding paradigm of navigating to websites entered in an address bar of a web browser, without providing further guidance or content-related cues for navigating among digital content. Because the web browsers of some existing systems are empty slates in this sense, isolated from other content systems associated with user accounts or client devices, these systems cannot flexibly adapt to digital content creation, which frequently involves incorporating a variety of content items from various systems or networks to create digital works such as digital images, digital audio, and/or digital video. Indeed, due to their rigid nature, many existing systems cannot readily provide content-related context for content items displayed within a web browser, instead displaying content at an indicated web address without further insight.

Due at least in part to their inflexible nature, many existing web browsing systems inefficiently utilize computing resources, such as processing power and memory. Particularly, existing systems often generate and provide inefficient graphical user interfaces that require an excessive number of user interactions to access certain data and functionality. Indeed, many existing systems require navigating back and forth between many different applications or interfaces to create digital content, share digital content, and/or communicate with co-users within a web browser. As an example, existing systems are often compartmentalized or fragmented in their approaches to generating (or facilitating generation of) and sharing digital content, using many interfaces or applications to generate and share digital videos (or other types of digital content). Navigating through these large numbers of layers of interfaces and applications consumes excessive amounts of computing resources that could otherwise be preserved with more efficient user interfaces.

Thus, there are several disadvantages with regard to existing web browsing systems.

SUMMARY

This disclosure describes one or more embodiments of systems, methods, and non-transitory computer readable storage media that provide benefits and/or solve one or more of the foregoing and other problems in the art. For instance, the disclosed systems provide a new web browser tailored for content creation that integrates features of a content management system with internet browsing capabilities for a low-friction workflow for generating digital content and collaborating between user accounts. Specifically, the disclosed systems provide a creativity web browser that includes specialized interface elements for restructuring web browsing to focus on content-related context (e.g., content collections, projects, or topics) across multiple systems or platforms, such as internet locations and/or a content management system, within an integrated web browsing environment.

Additional features of the disclosed systems are described below.

BRIEF DESCRIPTION OF THE DRAWINGS

This disclosure will describe one or more example implementations of the systems and methods with additional specificity and detail by referencing the accompanying figures. The following paragraphs briefly describe those figures, in which.

DETAILED DESCRIPTION

Figure 1:
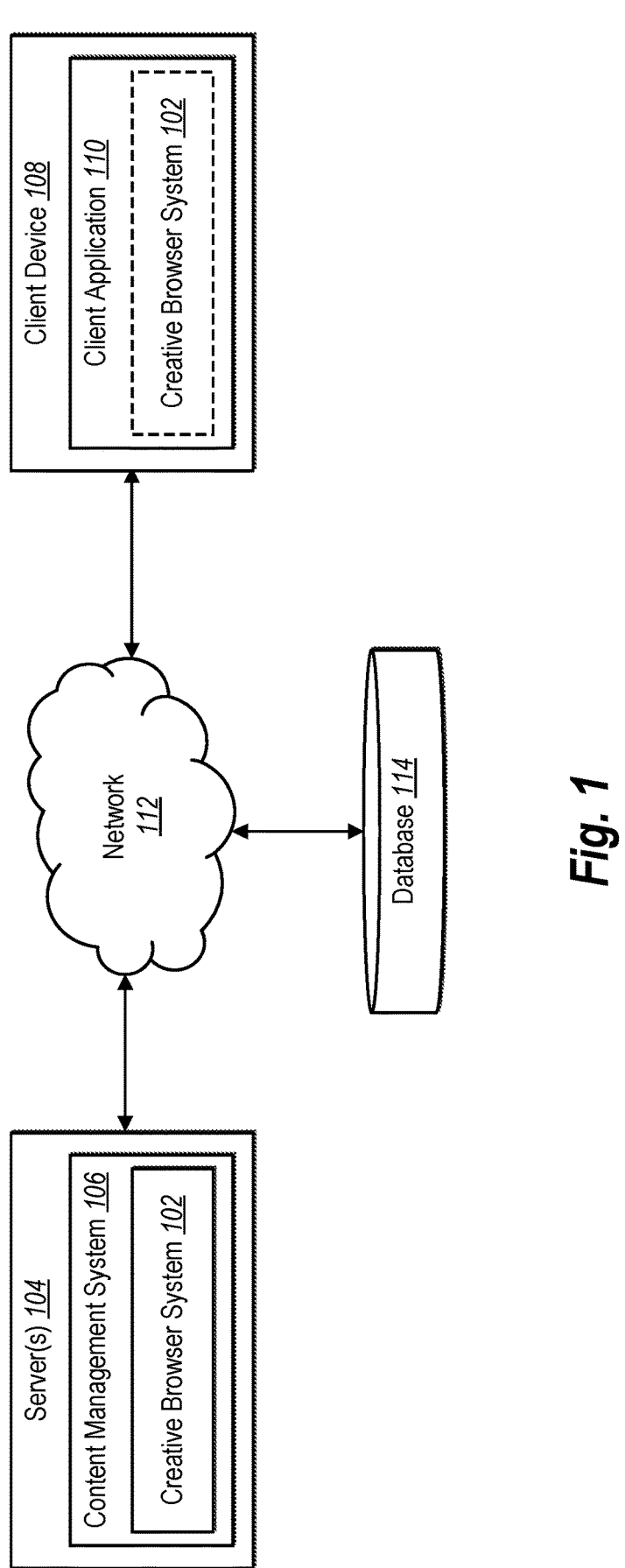
FIG. 1 illustrates a schematic diagram of an example environment of a creative browser system in accordance with one or more embodiments.

This disclosure describes one or more embodiments of a creative browser system that can improve web browsing function. In particular, the creative browser system provides a new web browser specialized for content creation, with unique interface elements geared toward streamlining the process of accessing, generating, and sharing digital content. In practical scenarios, content creators frequently navigate between many applications, platforms, or interfaces to generate and share digital content with co-user accounts or on social media. Unfortunately, existing web browsers provide little, if any, guidance or context for aiding in the creative process, instead requiring content creators to generate content items using one system, locate the content items stored in another system, and upload the content items to a web browser to ultimately share via the internet. Motivated by this issue, the creative browser system integrates functions of a content management system into a creativity web browser focused on generating and sharing digital content with a more streamlined, low-friction process.

As just mentioned, the creative browser system can provide a creativity web browser that integrates unique content creation features together with features of a content management system. For example, the creative browser system provides direct access to content items associated with a user account within a content management system via a web browser interface. Specifically, the creative browser system generates, groups, or arranges content collections that include content items stored in a (cloud-based) database of a content management system and that also include links to websites or clips (e.g., sub-parts or chunks of digital content) taken from websites (or other content items). For instance, the creative browser system generates content collections to include content items for a common topic, a common project, a common set of co-users, or based on some other relationship between the content items. The creative browser system further provides metadata layers for displaying information relating to the content collections for display within a web browser interface (e.g., for a webpage) for creating, editing, sharing, and communicating about the content items within the collections.

In some cases, the creative browser system provides a web browser interface that includes various components or elements tailored specifically for improving one or more aspects of the digital content timeline, from creation to collaboration to distribution. For example, the creative browser system provides a digital canvas as part of a web browser interface. More particularly, the creative browser system provides a digital canvas for displaying or presenting content collections or content items such as one or more websites, digital images, digital documents, digital videos, folders, or other content items.

Within a digital canvas, the creative browser system can provide or present content items selected from another interface element (e.g., a content collection pane of the web browser interface) or accessed via an address bar. In some cases, the creative browser system provides or displays a set of content collections within the digital canvas, where each collection shares a common relationship, such as a theme or group of collaborative co-user accounts. Indeed, the creative browser system can access a network location (e.g., a URL) for a content item (e.g., a public network address for a webpage or a private network address for a stored digital image) to display within a digital canvas together with metadata layers to augment presentation of digital content and/or to provide various functionality described herein.

For instance, the creative browser system can use metadata layers in the form of interface elements such as a digital canvas, a content collection pane, a timeline homepage, and/or an x-ray pane for augmenting presentation of content items for integration with a content management system. Indeed, the creative browser system can use metadata layers for presenting or displaying additional information (e.g., metadata) to accommodate displayed content items. Metadata layers can also or alternatively include supplemental interface elements (not directly corresponding to displayed content items) for facilitating interactive functions associated with displayed content items. In some cases, the creative browser system generates metadata layers that can include interface elements within the various panes or display windows, such as content cards, comment indicators, co-presence indicators, video message indicators, reaction menus, unorganized content elements, comment elements, async check-in elements, and/or interactive input panels. Additional detail regarding the various interface elements made up of metadata layers is provided below.

In some implementations, the digital canvas acts as a main viewing window for a web browser interface, where other interface elements (e.g., a content collection pane, an x-ray pane, an address bar, or a floating content collection banner) overlap or overlay portions of the digital canvas when open or displayed (rather than resizing the digital canvas). Indeed, the creative browser system can slide other interface elements over the top of the digital canvas as they are needed and can slide them back to disappear from view and no longer occlude (portions of) the digital canvas. In other implementations, the creative browser system resizes the digital canvas based on opening or displaying one or more other interface elements that take up display area within the web browser interface (e.g., to fit the frame of the remaining area not taken by the other interface elements).

As just mentioned, in one or more embodiments, the creative browser system can provide additional components within a web browser interface, such as a content collection pane. To elaborate, the creative browser system can provide or display a content collection pane within a web browser interface in relation to (e.g., on the right side, left side, the top, or the bottom of) the digital canvas. In some cases, the creative browser system can generate or identify one or more content collections to include (for display) within the content collection pane. For instance, the creative browser system can identify, to include within the content collection pane, a content collection relating to a particular project of a user account and including (links to) content items stored within a content management system and further including (links to) content items from the internet (e.g., websites or other web-based content items). The creative browser system can also identify other content collections to include within the content pane.

In certain embodiments, the creative browser system can provide an x-ray pane as part of a web browser interface. More specifically, the creative browser system can provide an x-ray pane that includes contextual information or insight data that expounds on or relates to one or more content items displayed within a digital canvas. To populate the x-ray pane, the creative browser system can determine or identify insight data associated with one or more content items displayed within a digital canvas, including content creation information for a creator account of the at least one content item, a comment from another client device related to the at least one content item, or a link to a website related to the at least one content item. Additional detail regarding the various components or elements of the creativity web browser is provided below with reference to the figures.

Within a web browser interface, the creative browser system can provide one or more of the aforementioned elements or components. In addition, the creative browser system can move content items freely between the interface elements to, for example, add a content item displayed in a digital canvas to a particular content collection displayed in a content collection pane. In some embodiments, the creative browser system can discretize content items displayed within a digital canvas (or elsewhere) to generate content clips (which become independent content items themselves) from sub-portions of other content items. The creative browser system can freely move the content clips (e.g., selected text, selected images, image portions, interface elements, or other digital content) among the various elements or components of the web browser interface to store or move the newly created content items at various locations (e.g., within content collections in a content management system).

As suggested above, the creative browser system can provide several improvements or advantages over existing web browsing systems. For example, some embodiments of the creative browser system introduce a web browser interface not found in prior systems. Indeed, the creative browser system can generate and provide a web browser interface that includes unique components such as a digital canvas, a content collection pane, and an x-ray pane. Additionally, the creative browser system provides a web browser interface that integrates digital content access and storage functions of a content management system together with internet access and web browsing functions for seamless creation, management, and sharing of (and collaboration regarding) digital content.

By combining features of a content management system with those of a web browsing system, the creative browser system can improve flexibility over prior web browsing systems. For example, whereas the fragmented nature of some prior systems limits their adaptability to provide content-related context across their isolated platforms and applications, the creative browser system can flexibly adapt to provide full integration of content items (and content management tools) specific to user accounts directly within a web browser interface. Indeed, the creative browser system can bridge the gap between creating digital content and sharing digital content by intelligently (and automatically) identifying content items associated with a user account from multiple locations, including storage within a content management system or web address on the internet. Indeed, unlike prior systems, by providing a web browser interface that includes a content collection pane, a digital canvas, and/or an x-ray pane, the creative browser system flexibly provides an adaptive ecosystem that accommodates creation and sharing of content items together within a single platform.

Due at least in part to its improved flexibility, embodiments of the creative browser system can provide more efficient user interfaces than those provided by existing web browsing systems. While the fragmented nature of some prior systems requires several applications or interfaces to access, generate, upload, and eventually share content items, the creative browser system incorporates content item storage, management, and access features of a content management system (e.g., a cloud-based content storage system) for a user account directly within a web browser interface for seamless use, creation, sharing of (and collaboration on) content items over the internet. Specifically, the creative browser system consolidates the creation, sharing, and collaboration of content items from various locations (e.g., from a content management system or internet locations) to a single location or a single access point (for a given user account) within a web browser interface for creation, sharing, and collaborating over the internet. By providing a more efficient web browser interface that includes a digital canvas together with a content collection pane (and/or an x-ray pane), the creative browser system reduces the number of user interactions required to generate, share, and collaborate on digital content.

As illustrated by the foregoing discussion, the present disclosure utilizes a variety of terms to describe features and benefits of the creative browser system. Additional detail is hereafter provided regarding the meaning of these terms as used in this disclosure. As used herein, the term "digital content item" (or simply "content item") refers to a digital object or a digital file that includes information interpretable by a computing device (e.g., a client device) to present information to a user. A digital content item can include a file such as a digital text file, a digital image file, a digital audio file, a webpage, a website, a digital video file, a web file, a link, a digital document file, or some other type of file or digital object. A digital content item can have a particular file type or file format, which may differ for different types of digital content items (e.g., digital documents or digital images). In some cases, a digital content item can refer to a remotely stored (e.g., cloud-based) item or a link (e.g., a link to a cloud-based item or a web-based content item) and/or a content clip that indicates (or links) a discrete selection or segmented portion of content from a webpage (e.g., a public or private URL containing HTML, JavaScript or some other web-based coding provided via hypertext transfer protocol) or some other content item or source. A digital content item can be editable or otherwise modifiable and can also be sharable from one user account (or client device) to another. In some cases, a digital content item is modifiable by multiple user accounts (or client devices) simultaneously and/or at different times.

As mentioned, the creative browser system can generate and provide a web browser interface that includes components or elements such as a digital canvas. As used herein, the term "digital canvas" refers to a web browser interface element or component that displays or includes one or more content items such as websites (or other types of content items). For example, a digital canvas can be a main component (e.g., a largest component) of a web browser interface that interacts with other components of a web browser interface, such as a content collection pane, an x-ray pane, or a floating content collection banner. In some cases, a digital canvas is interactive for user selection of individual clips or "chunks" of content displayed within the digital canvas (e.g., as part of a content item). A digital canvas can also indicate co-presence or co-browsing of other user accounts within a content item (e.g., a website) and can facilitate collaboration with co-users. In one or more implementations, a digital canvas presents content collections and provides interface elements for modifying or manipulating content items and/or content collections.

In some embodiments, the creative browser system provides a web browser interface that also (or alternatively) includes a content collection pane. As used herein, the term "content collection pane" refers to a web browser interface element or component that displays or includes content collections associated with a user account. For example, a content collection pane presents content collections generated or arranged by a user account or automatically generated (e.g., by a content management system) for the user account. In some cases, a content collection pane includes content collections made up of content items stored in a content management system (e.g., within the user account of the content management system) and/or links to websites and/or clips or pieces of content from websites (or other content items). In certain implementations, the content collection pane presents content collections organized by label (e.g., as automatically generated or input by a user account), theme, topic, project, collaborative co-user group, recency of access, frequency of access, or by some other metric associated with content items.

Within a content collection pane (or within a digital canvas), the creative browser system can generate and provide interactive content cards for display. As used herein, the term "interactive content card" (or simply "content card") refers to an interactive, selectable interface object or element that represents or reflects a content item or a content collection. A content card can include a visual representation of a content item (or a content collection) in the form of a moveable tile that represents the content item (or the content collection). In some cases, a content card is moveable between components of a web browser interface to, for example, move a content item from a content collection pane to a digital canvas (or vice-versa). A content card can include or display different amounts of information, depending on the size of the content card, the type of content item it represents, and/or the type (and/or number) of content item(s) within the content collection it represents. For example, a content card can be resizable to change from a small version depicting only text of a link to a website to a large version depicting a preview of the website associated with the link.

As mentioned, in some embodiments, the creative browser system generates and provides an x-ray pane within a web browser interface. As used herein, the term "x-ray pane" refers to a web browser interface component or element that displays or includes insight data (and other information or interface objects) pertaining to one or more content items displayed within a digital canvas (or associated with a user account). For example, an x-ray pane can include background information providing context for a content item, such as an identity of a website creator, a comment from a co-user about something with the website, a link to a content item related to a content item displayed in a digital canvas, a link to a content item created by the creator of a content item displayed in a digital canvas. As described in further detail below, an x-ray pane can include other information and/or interactive interface elements in relation to content items displayed within a digital canvas.

Relatedly, the term "insight data" refers to data or information providing background or context for one or more content items (e.g., content items displayed in a digital canvas). For instance, insight data can include: i) content creation information indicating a creator account (and other related information) for a content item, ii) a comment from another client device related to a content item, iii) a link to a website or other content item related to the at least one content item, iv) a video or audio clip from another client device (or user account) related to a content item, v) a link to a content item created by the creator of a content item displayed in a digital canvas, vi) an identity of a website host for a website displayed in a digital canvas, vii) an identity of a publisher for a website displayed in a digital canvas, viii) identities of collaborative co-user accounts with access to a content item, and/or ix) media data for media played within a digital canvas (e.g., musician information, lyrics, video creator information, video producer information, actor information).

In some cases, the creative browser system determines a browser journey associated with a user account. As used herein, the term "browser journey" (or sometimes simply "journey") refers to a series or a sequence of activity or user interactions performed by a user account to accomplish a result. For example, a browser journey can include a series of user interactions to generate and post digital video to a social media feed. As another example, a browser journey can include a series of user interactions across one or more application sessions to follow up with a set of collaborative co-users after a conference call. In some cases, the creative browser system determines or predicts activity within a browser journey based on what activity a user account has performed previously. For example, based on detecting that a user account records a digital video, the creative browser system can predict a website that a user account will visit to post a digital video to complete a browser journey and can recommend the predicted website to the user account.

As used herein, the term "application session" (or sometimes simply "session") refers to an instance of use within a client application or within a particular collection or folder or content item using a client application. For example, an application session refers a set of activities performed within a single login of a client application such as a creativity web browser or an application of a content management system. As another example, an application session refers to a set of activities performed within a single visit of a webpage or a single access of a content collection or folder. In some cases, a session requires a login while in other cases, a session does not require a login and instead indicates an instance of use between closures or terminations (of an application or webpage) or between visits that are at least a threshold period of time apart (or separated by a device power off or sleep mode).

Additional detail regarding the creative browser system will now be provided with reference to the figures. For example, FIG. 1 illustrates a schematic diagram of an example system environment for implementing a creative browser system 102 in accordance with one or more implementations. An overview of the creative browser system 102 is described in relation to FIG. 1. Thereafter, a more detailed description of the components and processes of the creative browser system 102 is provided in relation to the subsequent figures.

As shown, the environment includes server(s) 104, a client device 108, a database 114, and a network 112. Each of the components of the environment can communicate via the network 112, and the network 112 may be any suitable network over which computing devices can communicate. Example networks are discussed in more detail below in relation to FIGS. 16-17.

As mentioned above, the example environment includes a client device 108. The client device 108 can be one of a variety of computing devices, including a smartphone, a tablet, a smart television, a desktop computer, a laptop computer, a virtual reality device, an augmented reality device, or another computing device as described in relation to FIGS. 16-17. The client device 108 can communicate with the server(s) 104 and/or the database 114 via the network 112. For example, the client device 108 can receive user input from respective users interacting with the client device 108 (e.g., via the client application 110) to, for instance, access, generate, or share a content item or to collaborate with a co-user of a different client device. In addition, the creative browser system 102 on the server(s) 104 can receive information relating to various interactions with content items and/or user interface elements based on the input received by the client device 108 (e.g., to access content items, generate content items, or perform some other action).

As shown, the client device 108 can include a client application 110. In particular, the client application 110 may be a web application, a native application installed on the client device 108 (e.g., a mobile application, a desktop application, etc.), or a cloud-based application where all or part of the functionality is performed by the server(s) 104. Based on instructions from the client application 110, the client device 108 can present or display information, including a user interface such as a web browser interface that includes a digital canvas, a content collection pane, and/or an x-ray pane.

As illustrated in FIG. 1, the example environment also includes the server(s) 104. The server(s) 104 may generate, track, store, process, receive, and transmit electronic data, such as digital content items, interactions with digital content items, and/or interactions between user accounts or client devices. For example, the server(s) 104 may receive data from the client device 108 in the form of a request to generate a content item or to add a content item to a content collection within a content management system. In addition, the server(s) 104 can transmit data to the client device 108 in the form of a content item, a comment, insight data, or some other information. Indeed, the server(s) 104 can communicate with the client device 108 to send and/or receive data via the network 112. In some implementations, the server(s) 104 comprise(s) a distributed server where the server(s) 104 include(s) a number of server devices distributed across the network 112 and located in different physical locations. The server(s) 104 can comprise one or more content servers, application servers, communication servers, web-hosting servers, machine learning server, and other types of servers.

As shown in FIG. 1, the server(s) 104 can also include the creative browser system 102 as part of a content management system 106. The content management system 106 can communicate with the client device 108 to perform various functions associated with the client application 110 such as managing user accounts, managing content items, and facilitating user interaction with the digital content items. Indeed, the content management system 106 can include a network-based smart cloud storage system to manage, store, and maintain content items and related data across numerous user accounts. In some embodiments, the creative browser system 102 and/or the content management system 106 utilize the database 114 to store and access information such as digital content items, insight data, and other information.

Although FIG. 1 depicts the creative browser system 102 located on the server(s) 104, in some implementations, the creative browser system 102 may be implemented by (e.g., located entirely or in part) on one or more other components of the environment. For example, the creative browser system 102 may be implemented by the client device 108, and/or a third-party device. For example, the client device 108 can download all or part of the creative browser system 102 for implementation independent of, or together with, the server(s) 104.

In some implementations, though not illustrated in FIG. 1, the environment may have a different arrangement of components and/or may have a different number or set of components altogether. For example, the client device 108 may communicate directly with the creative browser system 102, bypassing the network 112. As another example, the environment may include multiple client devices, each associated with a different user account for managing digital content items and/or browsing the internet. In addition, the environment can include the database 114 located external to the server(s) 104 (e.g., in communication via the network 112) or located on the server(s) 104 and/or on the client device 108.

Figure 2:
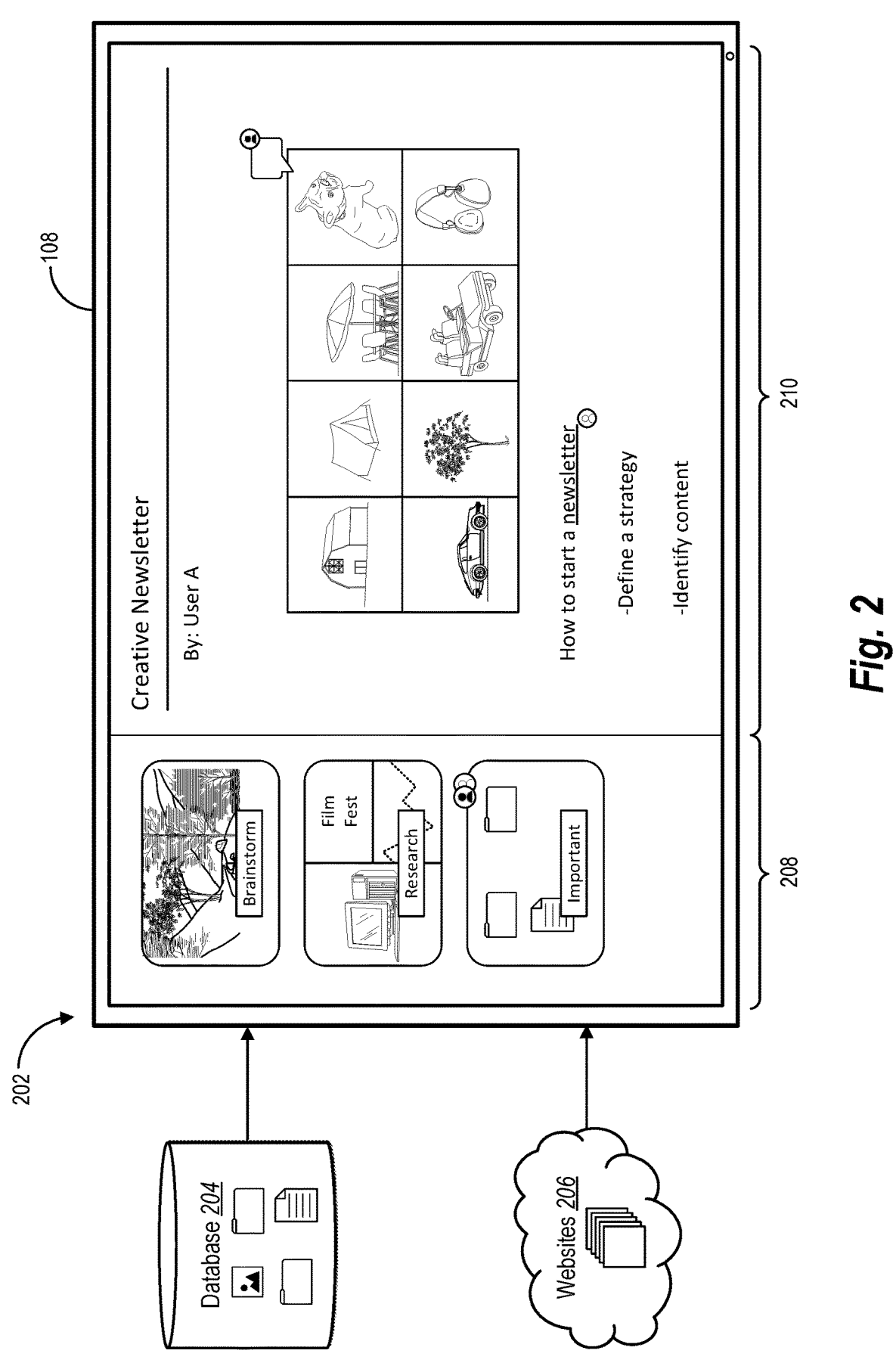
FIG. 2 illustrates an example overview of generating and providing a creativity web browser integrated with a content management system in accordance with one or more embodiments.

As mentioned above, the creative browser system 102 can generate and provide a creativity web browser that integrates feature of a content management system together with internet browsing features. In particular, the creative browser system 102 can generate a web browser interface that includes a digital canvas for displaying content items and that also includes a content collection pane for interacting with content collections within a content management system. FIG. 2 illustrates an example web browser interface of a creativity web browser in accordance with one or more embodiments. The description of FIG. 2 provides an overview of the web browser interface and its various components, and additional detail regarding the individual components or elements is provided thereafter with reference to subsequent figures.

As illustrated in FIG. 2, the client device 108 displays a web browser interface 202 that includes a content collection pane 208 together with a digital canvas 210. More specifically, the creative browser system 102 generates and provides the web browser interface 202 for display on the client device 108 by accessing a database 204 (e.g., the database 114) of the content management system 106 that stores content items associated with a user account, and by further accessing websites 206 from the internet. For example, the creative browser system 102 seamlessly integrates the database 204 of content items associated with the user account with the websites 206 to form a combined web browser interface 202 for interacting with content items from both the database 204 and the websites 206 together in a common environment. By providing the combined web browser interface 202 in this fashion, the creative browser system 102 facilitates improved access to, and manipulation of, content items for user accounts (e.g., content creators).

As opposed to prior systems that can only access a database of content items for a user account (e.g., the database 204 within the content management system 106) by navigating to and using a web interface for the content management system 106, the creative browser system 102 can integrate the database 204 with the creativity web browser such that the user account is tied to the browser itself and the creativity web browser is part of the content management system 106. Thus, the creative browser system 102 can provide access to the content items within the database 204 without requiring navigation to a particular website or web address. In some cases, the creative browser system 102 provides (constant) access to the content items within the database 204 at all times, irrespective of a content item or webpage displayed within the digital canvas 210 of the web browser interface 202.

As shown, the creative browser system 102 provides the web browser interface 202 to include the content collection pane 208 together with the digital canvas 210. In some cases, the creative browser system 102 provides the content collection pane 208 (and/or other interface elements) as an overlay occluding a portion of the digital canvas 210, where the content collection pane 208 appears when in use (e.g., slides out from the left frame) and disappears when not in use (e.g., slides back into the left frame). In one or more implementations, the creative browser system 102 provides the content collection pane 208 (and/or one or more other interface elements) having a measure of transparency or opacity as an overlay of the digital canvas 210. For instance, the content collection pane 208 can have an opacity that blurs or obscures the underlying content of the digital canvas 210 beneath it but that does not render the content entirely occluded or blocked.

In some embodiments, when displaying the content collection pane 208, the creative browser system 102 maintains the full frame of the digital canvas 210 such that the content collection pane 208 overlaps digital content within the portion of the digital canvas 210 that underlies the content collection pane 208 (until the content collection pane 208 disappears when not in use). The creative browser system 102 can perform similarly for other interface elements as well. In other embodiments, the creative browser system 102 does not overlay the content collection pane 208 on the digital canvas 210 but instead resizes the digital canvas such that the full frame of the content item displayed in the digital canvas 210 becomes smaller in total area to fit the area (so that no content is overlapped) not occupied by the content collection pane 208 (or by other interface elements). The creative browser system 102 can perform likewise for other interface elements as well. Indeed, the content collection pane 208 (and other interface elements) can be pinnable to fix in place so that they persist and do not vanish when not in use to cause the creative browser system 102 to resize or reframe the digital canvas 210 to fit the remaining area.

Within the content collection pane 208, the creative browser system 102 provides a set of content collections for display and for user interaction. For example, the creative browser system 102 provides content collections that include content items from the database 204 and/or (links to) one or more of the websites 206 (or clips from the websites 206). As illustrated, the creative browser system 102 provides content collections in the form of interactive content cards that visually represent the content items within each respective collection.

For instance, the creative browser system 102 provides a content card for the "Brainstorm" collection in the form of a single image of a forest (e.g., for a single content item in the collection or for a most prominent theme or topic in the content collection or for a most frequently or most recently accessed content item in the collection). In addition, the creative browser system 102 provides a content card for the "Research" collection to include visual representations of three different content items within the collection, where one visual representation is larger than the other two (e.g., based on factors such as recency or frequency of access). The creative browser system 102 further provides a content card for the "Important" collection to visually represent three different content items within the collection, two of which are folders and one of which is a digital document. As shown, the creative browser system 102 also provides a visual indication of co-users with access to one or more content items within the "Important" collection (or with access to the entire collection).

The creative browser system 102 can receive or detect user interaction with one or more of the content cards within the content collection pane 208. For example, the creative browser system 102 can receive a selection of a content card representing a content collection or representing a content item within a collection. In addition, the creative browser system 102 can receive user interaction to view the content item (or the content collection), whereupon the creative browser system 102 provides the content item (or collection) for display within the digital canvas 210. The creative browser system 102 can also receive user interaction to move (e.g., via a click-and-drag) a content card from one location to another (e.g., to move a content item from one content collection to another or to drop a content card into the digital canvas 210 for viewing the corresponding content item). Additional detail regarding the content collection pane is provided hereafter with reference to subsequent figures.

As further illustrated in FIG. 2, the creative browser system 102 provides the digital canvas 210 within the web browser interface 202. Within the digital canvas 210, the creative browser system 102 provides one or more content items for display. As shown, the creative browser system 102 provides a website for display, entitled "Creative Newsletter." For instance, the creative browser system 102 provides the website for display based on receiving a selection of a content card or a link representing the website from within a content collection of the content collection pane 208.

As further shown, the creative browser system 102 indicates co-presence or co-browsing of other user accounts within the digital canvas 210. For instance, the creative browser system 102 detects or identifies one or more other user accounts also viewing the content item of the digital canvas 210. In response, the creative browser system 102 generates and provides co-presence indicators within the digital canvas 210 to indicate the co-presence of the other user accounts. For example, the creative browser system 102 provides a co-presence indicator in the form of a small chip or token that represents another user account and that is selectable (and expandable) to view additional detail regarding the co-presence (e.g., to view or listen to a text comment, a video comment, or an audio comment left by the co-user and/or to interact with the co-user while co-browsing). In some cases, the creative browser system 102 indicates a cursor location or a viewing location of another user account and/or indicates a comment left by a co-user in relation to a portion of the content item displayed within the digital canvas 210. The creative browser system 102 can update locations of the co-presence indicators in real time (or at set intervals or based on co-user activity) to update locations in the content item where co-users are viewing or otherwise interacting. Additional detail regarding the digital canvas is provided hereafter with reference to subsequent figures.

As just mentioned, in certain described embodiments, the creative browser system 102 generates and provides a digital canvas that facilitates efficient collaboration between co-user accounts. In particular, the creative browser system 102 provides a digital canvas that indicates co-presence or co-browsing of other user accounts within a content item displayed in the digital canvas, and that further facilitates communication with the co-browsing user accounts (e.g., user accounts within the content management system 106).

Figure 3:
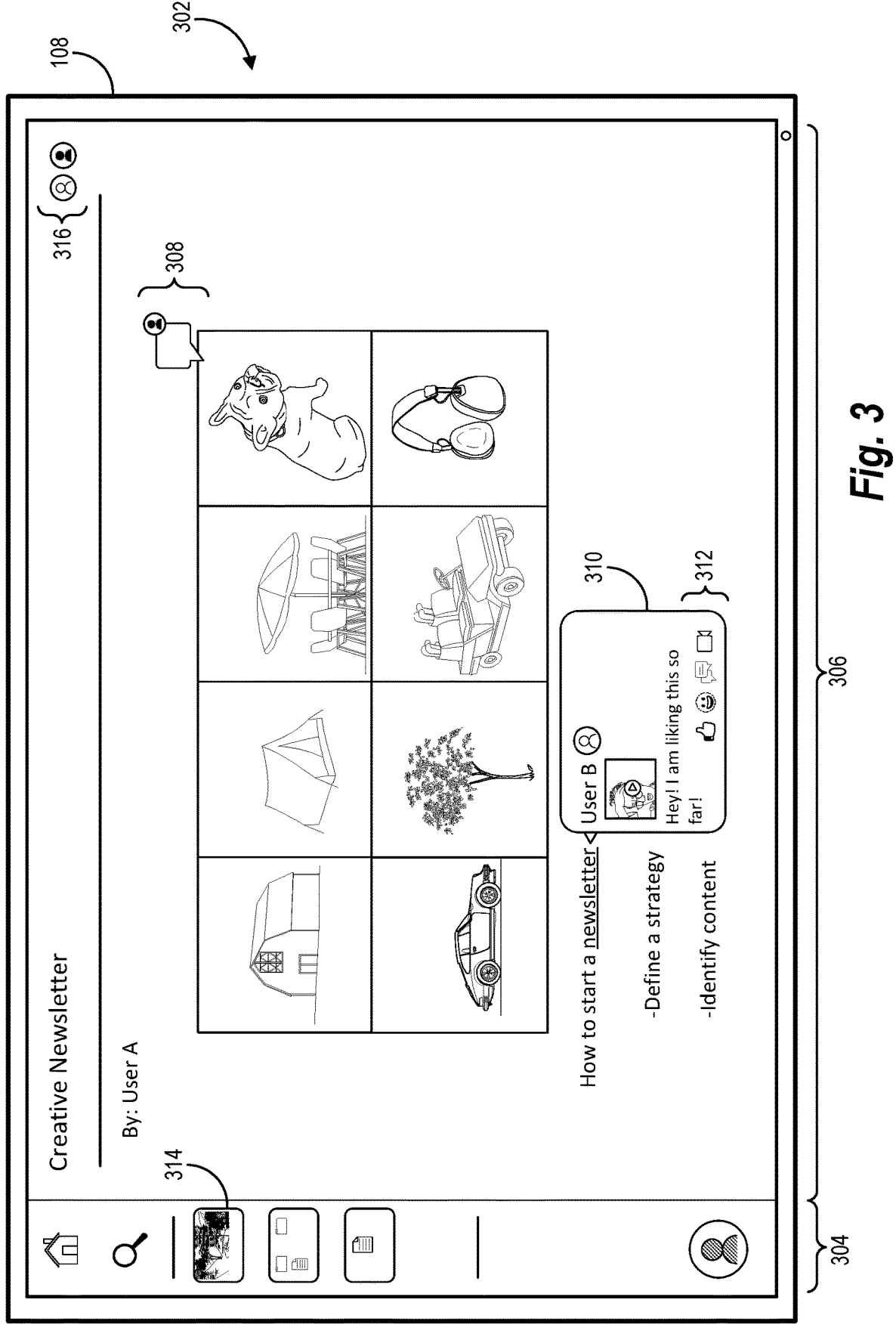
FIG. 3 illustrates an example web browser interface including a digital canvas in accordance with one or more embodiments.

FIG. 3 illustrates an example digital canvas for indicating co-presence of, and for facilitating communication with, other user accounts.

As illustrated in FIG. 3, the client device 108 displays a web browser interface 302 that includes a content collection pane 304 and a digital canvas 306. As shown, the content collection pane 304 is a narrow version that includes smaller content cards (e.g., the content card 314) than those illustrated in FIG. 2. Indeed, in some cases, the creative browser system 102 provides content cards that are resizable and that can present different information and/or different amounts of information based on their size. For example, the creative browser system 102 resizes a content card based on user interaction to expressly resize a content card. As another example, the creative browser system 102 resizes a content card based on a dimension (e.g., a width) of the content collection pane 304 (e.g., to fill a percentage of the pane width).

As yet another example, the creative browser system 102 resizes a content card based on factors such as a type of digital content associated with the content card (e.g., where one type results in a larger card than another type), an indication of whether or not content items associated with the card are collaborative (e.g., accessible by other user accounts), and/or a number or a frequency of interactions by a user account to view or modify a content item associated with the content card (e.g., where more numerous or more frequent interaction results in a larger card). Based on resizing a content card, the creative browser system 102 can provide different amounts of information within the content card. For example, as shown in FIG. 3, the creative browser system 102 refrains from providing a title or label for the content cards in the content collection pane 304. Indeed, in some cases, the creative browser system 102 provides a preview of a content item (e.g., a live preview with movement or a still image) within a content card only when the content card is at least a threshold size. Otherwise, the creative browser system 102 presents a link or a simplified icon to represent a content item within a content card.

As further illustrated in FIG. 3, the creative browser system 102 provides the digital canvas 306 for display. Within the digital canvas 306, the creative browser system 102 provides the "Creative Newsletter" website for display. In addition, the creative browser system 102 provides a comment indicator 308 and a video message indicator 310 that each indicate a message left by a respective user account who also viewed the same website. As shown, the comment indicator 308 indicates that a first co-user has left a comment pertaining to a particular portion of digital content within the website—e.g., the image of the dog. Upon receiving a user interaction selecting the comment indicator 308, the creative browser system 102 can expand the comment indicator 308 (or can open a co-presence window for the comment indicator 308) to present the text of the comment and/or user account information for the co-user, including an account identification and a profile picture. In some cases, the creative browser system 102 provides the comment indicator 308 to further indicate simultaneous co-presence of a co-user account with the user account of the client device 108.

As mentioned, the digital canvas 306 also includes the video message indicator 310. In particular, the creative browser system 102 provides the video message indicator 310 to indicate a video message left by another user account who viewed or interacted with the "newsletter" word within the digital canvas 306. As shown, the creative browser system 102 generates the video message indicator 310 to include a playable video created and posted at the indicated location within the displayed website. In some embodiments, the creative browser system 102 plays the video in response to user interaction selecting the video message indicator 310 or the video within the video message indicator 310. In addition, the creative browser system 102 transcribes the video and provides a transcript of the video for display. In some cases, the creative browser system 102 provides a transcript preview within the video message indicator 310 and provides the full transcript within a co-presence window (which can also include a video player for playing, pausing, and scrubbing within the digital video) in response to user selection of the video message indicator 310. In some cases, the creative browser system 102 provides the video message indicator 310 to further indicate simultaneous co-presence of a co-user account with the user account of the client device 108.

In some cases, the creative browser system 102 further provides one or more co-presence indicators 316 that indicate co-presence or co-browsing of other user accounts within the same webpage (or other content item). In some cases, a co-presence indicator includes a bubble or a window presenting a live view or a non-live view (e.g., a captured video feed) of the other user (e.g., as they are co-browsing the website). To elaborate, rather than providing a still image of a user account profile as a co-presence indicator, the creative browser system 102 provides a moving video clip that represents the user (e.g., within a circle or some other icon shape at a co-presence location). In these or other cases, the creative browser system 102 provides a co-presence indicator that presents a repeating loop of a small video clip captured by a co-user and placed at the location indicated by the co-presence indicator (and representing the co-user).

As further illustrated in FIG. 3, the creative browser system 102 provides a reaction menu 312 in relation to the video message indicator 310 (or one of the co-presence indicators 316). More specifically, the creative browser system 102 provides the reaction menu 312 as part of (or adjoining or adjacent to) the video message indicator 310 to facilitate communicating with the co-user corresponding to the video message indicator 310. For instance, the creative browser system 102 provides a like option (e.g., the thumbs up icon) selectable to like the comment (e.g., the video comment, the audio comment, or the text comment) left by the co-user. In addition, the creative browser system 102 can provide other reaction options such as a laugh emoji, a high five emoji, or some other emoji that reflects a reaction.

As further shown, the creative browser system 102 provides a reply option (e.g., the icon with two overlapping message bubbles) within the reaction menu 312, where the reply option is selectable to reply to the video comment left by the co-user. Additionally, the creative browser system 102 provides a video chat option (e.g., the camera icon) within the reaction menu 312. Based on user interaction with the video chat option, the creative browser system 102 can initiate and facilitate a video chat between the user account of the client device 108 and the co-user account of the video message indicator 310 (or one of the co-presence indicators 316). For instance, based on a single interaction selecting the video chat option, the creative browser system 102 can open a video chat window within the web browser interface 302 and can call the co-user to quickly collaborate about content within the digital canvas 306 (or about something else). Indeed, because the video message indicator 310 (or some other co-presence indicator) indicates simultaneous co-presence of the co-user with the user account of the client device 108, the creative browser system 102 can facilitate fast, efficient communication and collaboration between user accounts with one or more of the options in the reaction menu 312 (e.g., without needing to wait for co-users to log on to see comments or replies).

In some cases, the creative browser system 102 provides additional or alternative options within the reaction menu 312. For example, the creative browser system 102 provides a text chat option selectable to initiate a live text chat between co-users and/or an audio response option selectable to record an audio response to the comment of the video message indicator 310. Additionally, based on receiving an input in relation to an option from the reaction menu 312, the creative browser system 102 can provide a response indicator for display on a client device of the co-user indicating the response (e.g., within a co-presence indicator on the co-user device).

In one or more embodiments, the creative browser system 102 integrates the activity of a user account within the web browser interface 302 to the content management system 106 to make content items automatically accessible by other users (e.g., by publishing a collection to co-user accounts). However, in some cases, the creative browser system 102 provides selectable options to open and use private tabs or private digital canvases within a web browser interface. The creative browser system 102 refrains from publishing content items or activities from the private tabs so that co-user accounts cannot access the private content.

In certain embodiments, the creative browser system 102 facilitates changing between user accounts or changing browsing identities associated with a user account. For example, based on user interaction selecting the user account icon in the lower left of the web browser interface 302 (e.g., at the bottom of the content collection pane 304), the creative browser system 102 provides a set of browsing identities associated with the user account of the client device 108, such as a private identity, a work identity, a social identity, a content creator identity, or some other identity associated with the user account. The creative browser system 102 can further receive a selection of a browsing identity and can modify the user account icon to depict the new browsing identity. In certain cases, the creative browser system 102 modifies browser behavior for different profiles where, for example, predicted browser journeys (described below) and predicted activities may differ across various browsing identities. As another example, the creative browser system 102 provides a different default view of the content collection pane 304 for a different browsing identity by, for example, providing a larger content collection pane with larger content cards for a content creation identity and by providing a smaller content collection pane with smaller content cards for a work identity.

Figure 4:
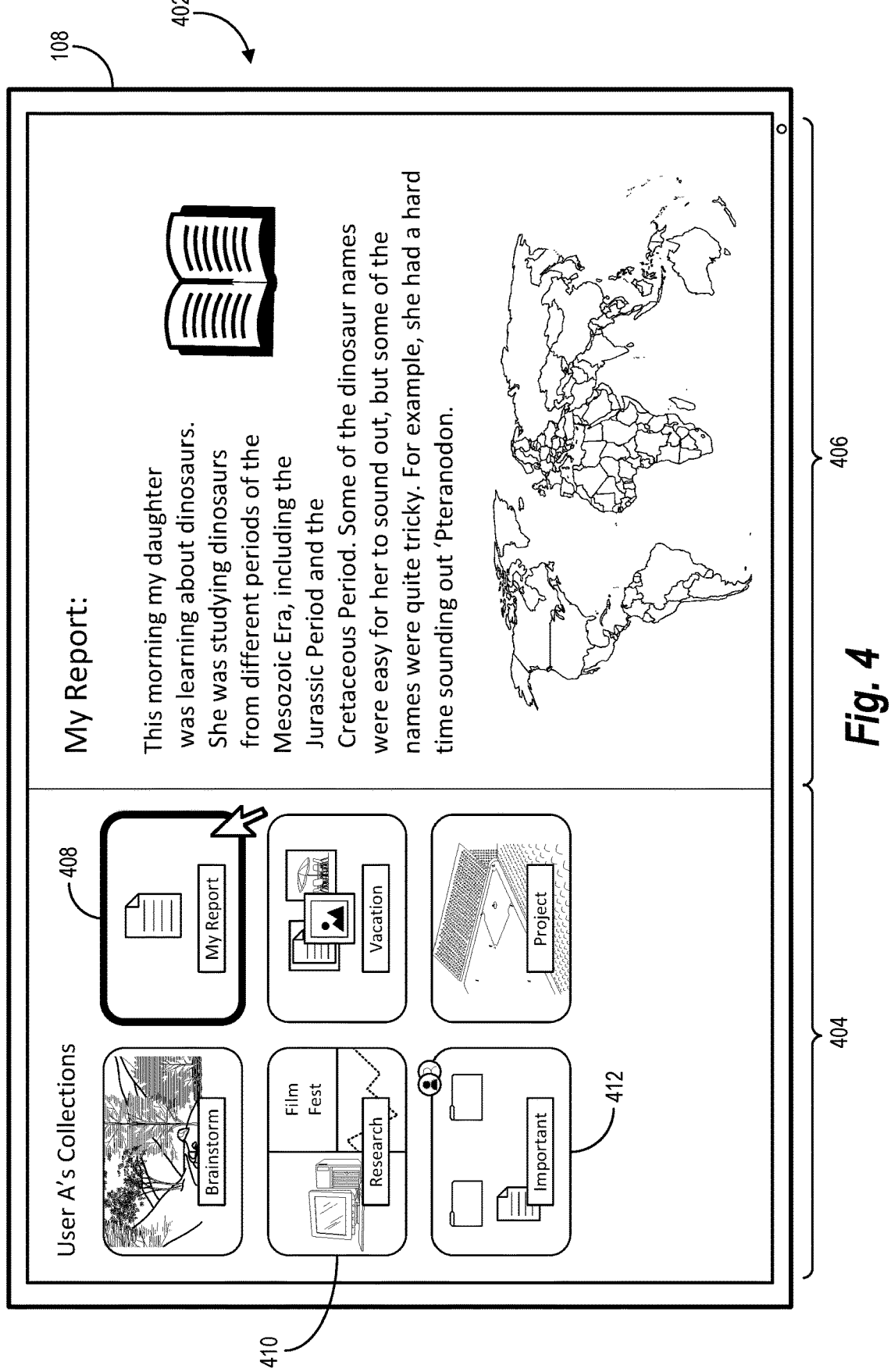
FIG. 4 illustrates an example web browser interface including a content collection pane and a digital canvas in accordance with one or more embodiments.

As mentioned, in one or more embodiments, the creative browser system 102 provides different versions of a content collection pane. In addition, the creative browser system 102 provides different types of content items for display within a digital canvas. FIG. 4 illustrates a web browser interface including variations of a content collection pane and a digital canvas in accordance with one or more embodiments.

As illustrated in FIG. 4, the client device 108 displays a web browser interface 402 that includes a content collection pane 404 and a digital canvas 406. Within the content collection pane 404, the creative browser system 102 provides a set of content collections, each represented by a content card. As shown, the content cards 408-412 each represent a respective content collection with a larger form factor than the content cards illustrated in FIG. 3. In some cases, the creative browser system 102 determines that the content cards 408-412 satisfy an area threshold to display a label or a title within them and/or to use more detailed visual representations (e.g., with divided areas for different content items such as those of the content card 410). For instance, based on user interaction to increase the size of the content cards 408-412 and/or to increase the size of the content collection pane 404, the creative browser system 102 adjusts or updates the sizes of the content cards 408-412. In some cases, the creative browser system 102 provides selectable options to present the content cards 408-412 in different formats, such as a list view (to show less information per content card in a condensed view or a card view (to show more information per content card in a larger format). Based on updating the size of the content cards 408-412, the creative browser system 102 further updates their visual appearance, including labels and/or digital images included within the content cards 408-412.

Indeed, each of the content cards 408-412 depict or portray the constituent content items within their respective content collections using different visualizations. For example, the creative browser system 102 generates the content card 408 to include or depict a digital document icon indicating that the "My Report" collection includes a digital document (and nothing more). As another example, the creative browser system 102 generates the content card 410 to include or depict divided areas that each represent different content items within the "Research" collection. For instance, the creative browser system 102 generates a first (e.g., largest or most prominent) digital image of a computer to represent a first content item within the "Research" collection that is most (or most frequently or most recently) interacted with from the content collection. In addition, the creative browser system 102 generates a second digital image of a title or topic ("Film Fest") to represent a second content item that is also included within the content collection (e.g., a second most frequently or second most recently selected). Further, the creative browser system 102 generates a third digital image of a line graph to represent a third content item that is included within the content collection (e.g., a third most frequently or third most recently selected).

Further, the creative browser system 102 generates the content card 412 to include or depict multiple icons reflecting different types of content items (e.g., two folders and a digital document) within the "Important" collection. In addition, the creative browser system 102 visually indicates that the "Important" collection is a collaborative content collection by providing collaborative co-user indicators together with (e.g., overlaid in the upper right corner of) the content card 412. In some cases, the collaborative user indicators are interactive or selectable to view additional information about, and to communicate with (e.g., via text, audio, and/or video), the collaborative co-user accounts.

In some cases, the creative browser system 102 receives user interaction selecting a content card such as the content card 410. In response to the selection, the creative browser system 102 further provides content item elements representing content items within the "Research" collection for display within the content collection pane 404 (or within the digital canvas 406). Thus, the creative browser system 102 provides selectable elements (e.g., content cards) for viewing or manipulating the content items within the content collection within the content collection pane 404 (or the digital canvas 406). The creative browser system 102 can further receive a user interaction to exit or close a content collection return the content collection pane 404 to displaying the content cards displayed in FIG. 4 (e.g., the content cards 408-412).

In one or more implementations, the creative browser system 102 provides one or more content items from within the content collection pane 404 for display in the digital canvas 406. To elaborate, the creative browser system 102 receives user interaction selection (or dragging and dropping) a content item from a content collection of the content collection pane 404. In response, the creative browser system 102 provides the content item for display within the digital canvas 406. As shown, the creative browser system 102 receives a selection of the content card 408 that represents a single content item: "My Report," a digital document stored for the user account of the client device 108 within the content management system 106. The creative browser system 102 can indicate the selection of the content card 408 by making the content card 408 appear visually distinct from other content cards within the content collection pane 404 (e.g., with a different color, shading, thicker lines, or some other visual indication). Indeed, the digital canvas 406 displays the digital document within the digital canvas 406 to replace the previously displayed website shown in FIG. 3 (e.g., transitioning from displaying internet content such as a website to displaying content management system content associated with the user account).

Figure 5:
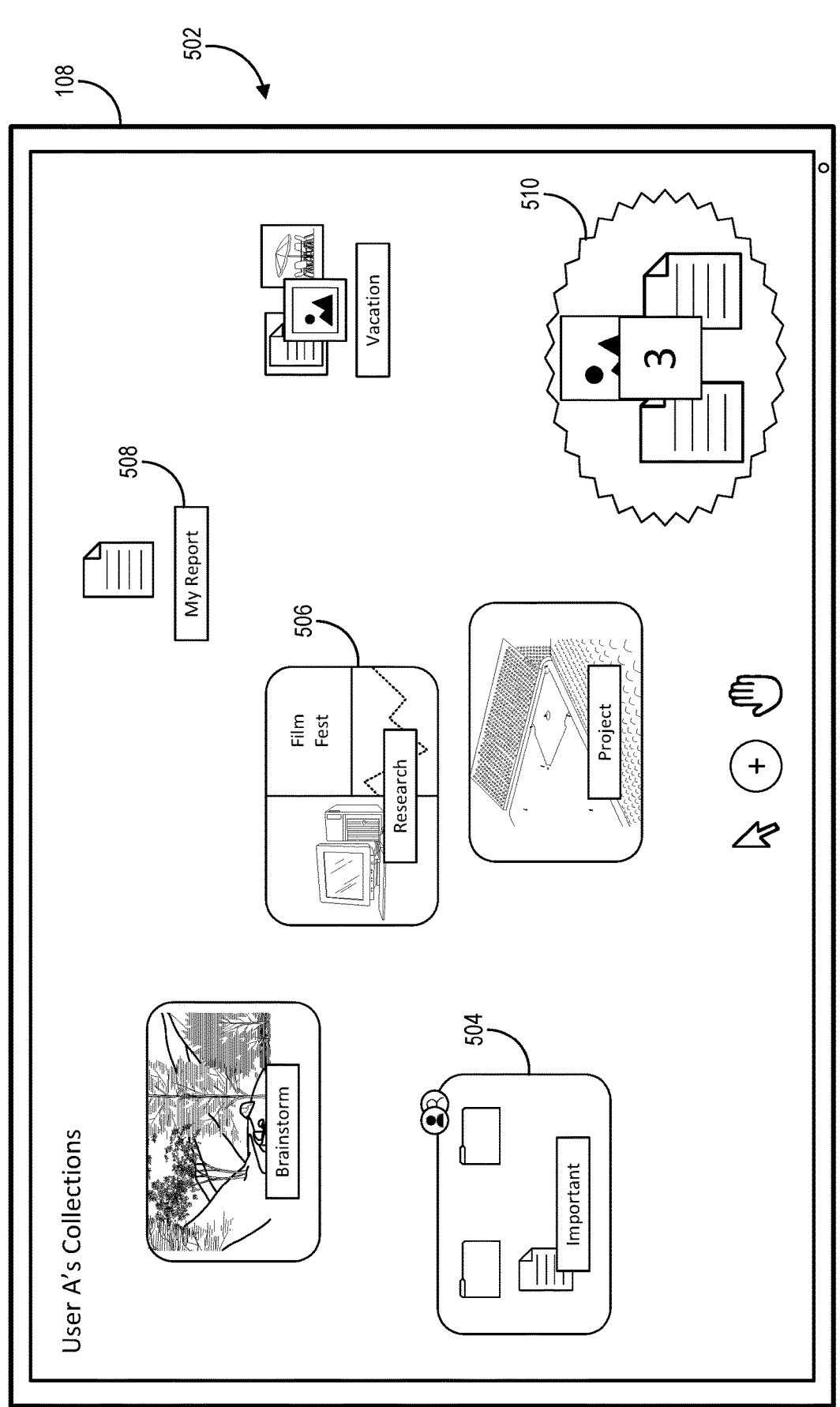
FIG. 5 illustrates an example web browser interface including a content collection view of a digital canvas in accordance with one or more embodiments.

As mentioned above, in certain described embodiments, the creative browser system 102 provides content cards for content collections within a digital canvas of a web browser interface. In particular, the creative browser system 102 can not only provide websites or other content items for display within a digital canvas, but the creative browser system 102 can also provide content cards representing content items and/or content collections for display as well. FIG. 5 illustrates an example digital canvas including interactive content cards in accordance with one or more embodiments.

As illustrated in FIG. 5, the client device 108 displays a web browser interface 502 that includes only a digital canvas (e.g., with no overlapping content collection pane or other overlapping interface elements). Within the digital canvas, the creative browser system 102 provides a set of content cards for "User A's Collections," where User A represents the user account associated with the client device 108. In some cases, the creative browser system 102 receives a user interaction requesting an expanded view of a content collection pane (e.g., the content collection pane 404), and the creative browser system 102 provides the content cards for display within a full-frame digital canvas.

For instance, the creative browser system 102 provides the content cards 504-508 for display within the digital canvas. As shown, the content card 504 represents the "Important" content collection and depicts three different content items (e.g., two folders and a digital document) within the collection. In addition, the content card 506 represents the "Research" content collection and depicts three different content items, while the content card 508 represents the "My Report" document (not within a content collection). In addition, the "Vacation" content collection is shown to include three different content cards for individual content items not organized within a single content card for a collection.

While FIG. 5 illustrates a particular arrangement of content cards (e.g., a random arrangement or an arrangement according to recency or frequency of access), the creative browser system 102 can further receive user interaction(s) to rearrange the content cards within the digital canvas (or within a content collection pane). For example, the creative browser system 102 receives user interaction(s) to move the content card 504 (or some other content card) from one location within the digital canvas to another. In some cases, the creative browser system 102 receives user interaction to combine one content collection into another (or to move a content item from one content collection to another). As another example, the creative browser system 102 receives a user interaction to move the "My Report" document into a content collection based on a drag and drop input over a particular content card. Similarly, the creative browser system 102 can receive user interaction selecting individual content cards or content items within the "Vacation Collection" to move, rename, or otherwise manipulate the content items. Based on changing the content items within a content collection, the creative browser system 102 updates the corresponding content card to visually represent the new content items. In certain example, the creative browser system 102 updates a content card to depict a most recently added content item within the corresponding content collection.

As mentioned, in some embodiments, the creative browser system 102 can expand a content card into a more detailed version to view and manipulate content cards for individual content items (e.g., within the expanded card of the content collection). For example, the creative browser system 102 expands a content card for a collection to depict a set of constituent content cards for content items included therein. In addition, the creative browser system 102 receives user interaction to move content cards to various locations of the expanded content card (or to rename content items or to edit other information associated with content items). In some cases, the creative browser system 102 includes other information within an expanded content card, such as co-presence indicators indicating which co-user accounts are currently viewing which content items of a collection. Additionally, the creative browser system 102 can also provide selectable options to communicate with co-users of a collection (e.g., collaborative co-users and/or co-browsing users) via text communication, audio communication, and/or video communication.

As further illustrated in FIG. 5, the digital canvas includes an unorganized content element 510 representing an unorganized content group. Specifically, the creative browser system 102 identifies or determines content items associated with the user account User A that have not been assigned a content collection. For example, the creative browser system 102 identifies content items from within the content management system 106 or previously visited, saved, or clipped from the internet that have not been assigned to a content collection.

In some implementations, the creative browser system 102 provides an option to automatically (e.g., without user interaction expressly assigning or labeling the content items) move content items within the unorganized content group into respective content collections. For instance, the creative browser system 102 generates a predicted classification of a content item (e.g., from among a set of classifications corresponding to content collections associated with the user account User A) based on content item data, including words, images, and/or audio included in the content item, as well as insight data associated with the content item. In certain embodiments, the creative browser system 102 utilizes a content classification machine learning model (e.g., a neural network) trained classify content items. In other embodiments, the creative browser system 102 utilizes a heuristic content classification model that classifies content items according to a set of rules based on the aforementioned content item data. Additionally, the creative browser system 102 can generate a set of classifications corresponding to a set of content collections associated with a user account, and can update the set of classifications according to changes within or among the set of content collections.

Figure 6:
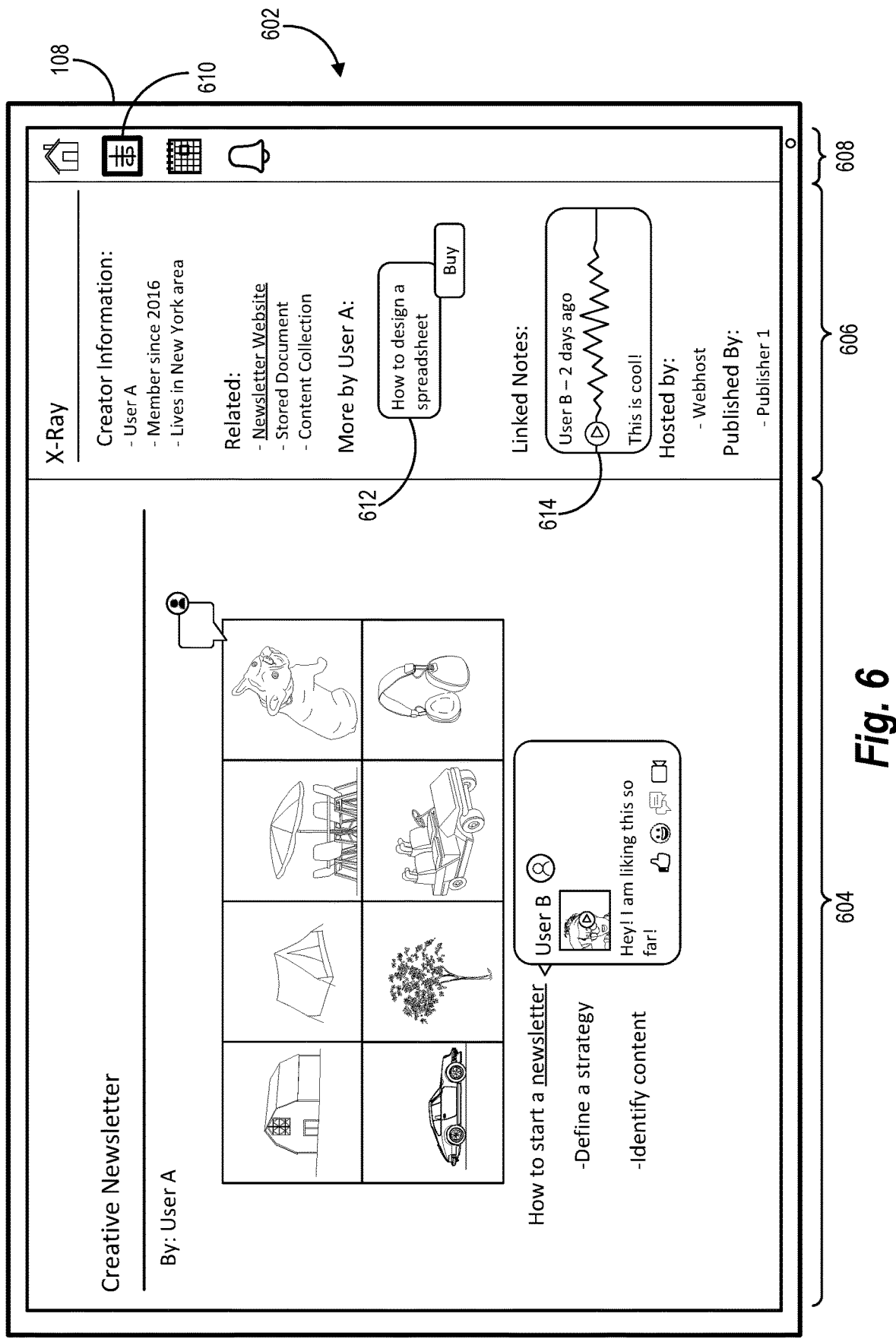
FIG. 6 illustrates an example web browser interface including a digital canvas and an x-ray pane in accordance with one or more embodiments.

As mentioned, in certain described embodiments, the creative browser system 102 can generate and provide a web browser interface that includes an x-ray pane. In particular, the creative browser system 102 can provide an x-ray pane together with a digital canvas for presenting insight data associated with one or more content items displayed within the digital canvas. FIG. 6 illustrates an example x-ray pane in accordance with one or more embodiments.

As illustrated in FIG. 6, the client device 108 displays a web browser interface 602 that includes a digital canvas 604, an x-ray pane 606, and a side panel 608. Within the digital canvas 604, the creative browser system 102 provides for display a "Creative Newsletter" website as described above in relation to the previous figures. In addition, the creative browser system 102 provides the x-ray pane 606 to present insight data associated with the "Creative Newsletter" website displayed within the digital canvas 604. Indeed, the creative browser system 102 determines or generates various insight data and/or other features or elements to include within the x-ray pane 606. Insight data can include any of the elements described hereafter, as displayed within the x-ray pane 606.

To elaborate, within the x-ray pane 606, the creative browser system 102 provides creator information that indicates an identity of a creator of the "Creative Newsletter" website (User A) and that further indicates information associated with the creator (e.g., member of the content management system 106 since 2016 and lives in New York area). In some cases, the creator information can include additional or alternative information, according to permissions set by the creator, such as contact information for the creator (e.g., an email address or contact information specific to the content management system 106), a date when the "Creative Newsletter" website was created, and/or an indication whether the creator User A is connected to the user account of the client device 108. In certain embodiments, one or more of the creator information items can be selectable to view or communicate with the creator of the "Creative Newsletter" website (User A).

As further shown, the creative browser system 102 also provides an indication of related content items. In particular, the creative browser system 102 determines or identifies content items (e.g., the "Stored Document") within the content management system 106 (e.g., stored for the user account of the client device 108) that are related to the displayed content item in the digital canvas 604—the "Creative Newsletter" website. In addition, the creative browser system 102 can identify other websites related to the "Creative Newsletter" website, such as the "Newsletter Website." The creative browser system 102 can also identify content collections related to the "Creative Newsletter" website. Further, the creative browser system 102 can provide selectable links to access the related content items from the x-ray pane 606.

In certain cases, the creative browser system 102 can identify the related content items by analyzing titles, creators, and content of content items. For instance, the creative browser system 102 determines similarity scores between content contents and the content item displayed in the digital canvas 604. In some embodiments, the creative browser system 102 utilizes a content comparison machine learning model (e.g., a neural network) to determine similarities by, for example, extracting feature vectors from the content items and determining distances (as similarity scores) between the feature vectors in a feature space (e.g., where closer distances indicate more similar content items). In other embodiments, the creative browser system 102 utilizes a heuristic model to determine similarity scores.

As further illustrated in FIG. 6, the creative browser system 102 provides additional content items created by the same creator as the content item displayed in the digital canvas 604. Specifically, the creative browser system 102 identifies another content item created by User A and provides a selectable additional content element 612 to access the other content item-"How to design a spreadsheet." In some cases, the creative browser system 102 determines that a content item (corresponding to the additional content element 612) is available for purchase and provides a purchase option ("Buy") to accommodate the link to the content item to facilitate purchasing the content item directly from the x-ray pane 606.

Additionally, in one or more embodiments, the creative browser system 102 identifies or determines notes or comments left by co-users (of the content management system 106 and/or the creativity web browser). To elaborate, the creative browser system 102 detects that a co-user creates a text comment, an audio comment, or a video comment associated with the content item displayed within the digital canvas 604. For instance, the creative browser system 102 identifies comments attached to, added to, or otherwise labeled as corresponding to the "Creative Newsletter" website. In some instances, the creative browser system 102 analyzes the comments to determine that they correspond to the "Creative Newsletter" website (e.g., by comparing the content within the comments to the content of the website). For example, the creative browser system 102 utilizes a content comparison machine learning model (e.g., a neural network) to determine similarities by, for example, extracting feature vectors from content items and comments and determining distances (as similarity scores) between the feature vectors in a feature space (e.g., where closer distances indicate comments more similar to content item).

As shown, the creative browser system 102 provides a comment element 614 for display in the x-ray pane 606. More particularly, the creative browser system 102 generates and provides the comment element 614 as a selectable option for viewing, listening to, or otherwise consuming a comment left by another user (e.g., User B in this case). Specifically, the creative browser system 102 provides a play option within the comment element 614 for the user to listen to the comment left by User B. In some cases, the creative browser system 102 also transcribes the comment and provides a transcript (or at least the beginning of a transcript) within the comment element 614 ("This is cool!"). In some cases, the creative browser system 102 provides comment elements with different appearances for different types of comments, such as text comments (e.g., to include the text of the comment) or video comments (e.g., to include a video player to view the comment video).

As further illustrated in FIG. 6, the creative browser system 102 determines and provides additional or alternative insight data. For instance, based on determining that the content item within the digital canvas 604 is a website, the creative browser system 102 determines hosting information and publisher information to provide for display within the x-ray pane 606. As shown, the creative browser system 102 determines that the "Creative Newsletter" website is hosted by "Webhost" and published by "Publisher 1." In some cases, the creative browser system 102 provides this information to help user accounts corroborate information displayed within the digital canvas 604 and to establish the source of the information within the displayed content item.

In certain embodiments, the creative browser system 102 provides insight data specific to a particular content item within the digital canvas 604. Indeed, the creative browser system 102 can modify the type of insight data based on the type of digital content displayed in the digital canvas 604. As an example, the creative browser system 102 provides artist information, a release date, audio controls, lyrics, a producer name, a record label, sheet music, and/or other music information within the x-ray pane 606 to accompany a music file played within the digital canvas 604 (e.g., based on detecting display of an audio website such as SPOTIFY or PANDORA). As another example, the creative browser system 102 provides actor information, studio information, video controls, ratings, reviews, and similar movies within an x-ray pane based on detecting display of a digital video (e.g., via a video streaming website such as NETFLIX or DISNEY PLUS or via a video player for a digital video stored on the content management system 106).

As further illustrated in FIG. 6, the creative browser system 102 provides a side panel 608 for display within the web browser interface 602. Within the side panel 608, the creative browser system 102 provides selectable options for navigating between different panes (e.g., panes on the right side of the digital canvas 604. As shown, the creative browser system 102 displays the x-ray pane 606 based on user selection of the x-ray option 610. Based on selection of a different option in the side panel 608, the creative browser system 102 can replace the x-ray pane 606 with another pane.

Figure 7:
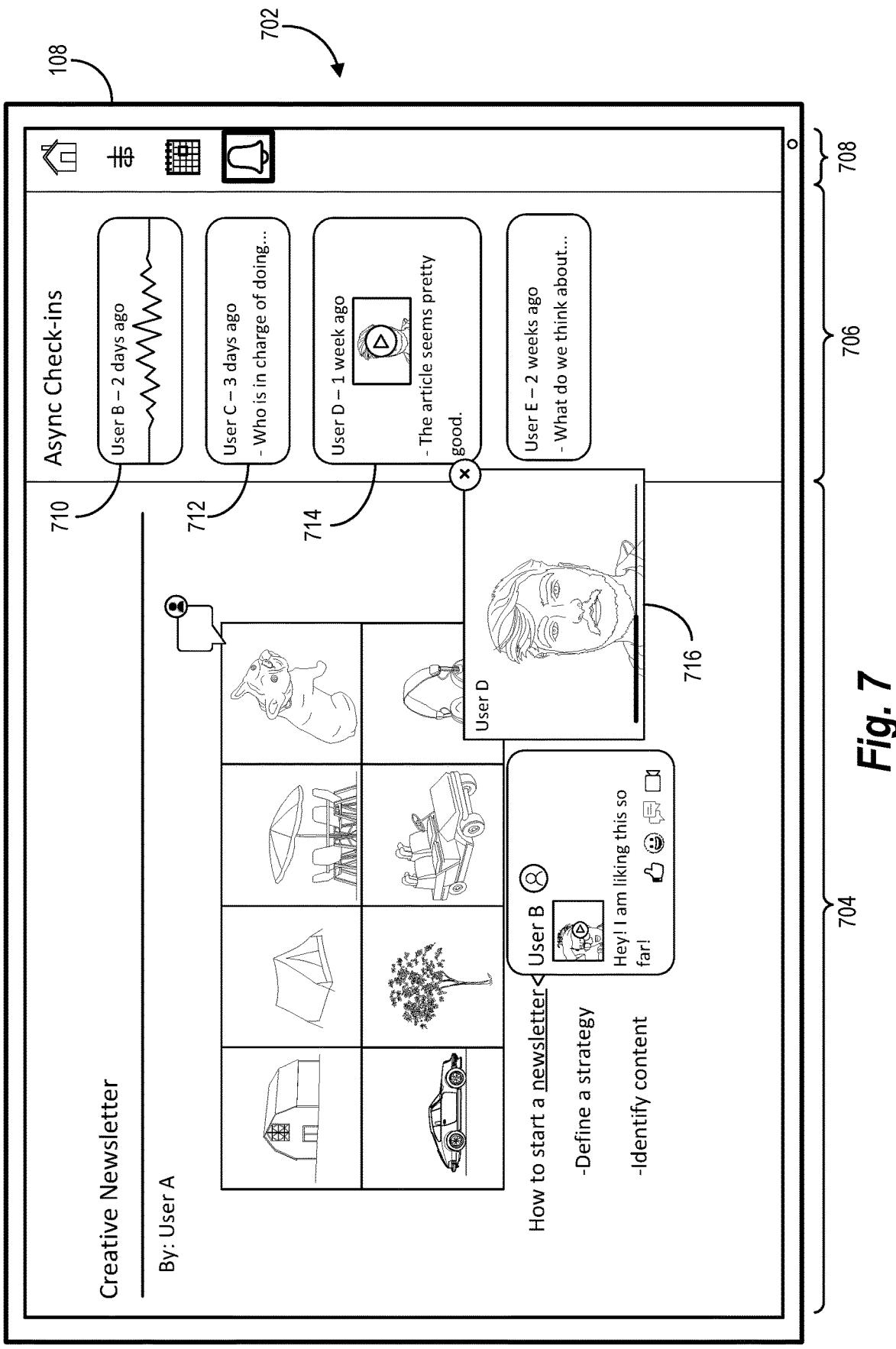
FIG. 7 illustrates an example web browser interface including a digital canvas and an async check-in pane in accordance with one or more embodiments.

As just mentioned, in certain embodiments, the creative browser system 102 can provide other panes to accompany a digital canvas. For example, the creative browser system 102 can provide an async check-in pane for display that includes messages left by co-users of the content management system 106 or co-users of the creativity web browser. FIG. 7 illustrates an example async check-in pane in accordance with one or more embodiments.

As illustrated in FIG. 7, the client device 108 displays a web browser interface 702 that includes a digital canvas 704, an async check-in pane 706, and a side panel 708 that indicates selection of an async check-in option (e.g., the bell icon). Within the async check-in pane 706, the creative browser system 102 provides selectable options for viewing, listening to, or otherwise consuming comments or messages left by co-users. As shown, the async check-in pane 706 includes async check-in elements 710-714. For example, the async check-in element 710 is for an audio message recorded by User B. The async check-in element 712 is for a text message created by User C, and the async check-in element 714 is for a video message created by User D. As shown, the creative browser system 102 organizes async check-in elements chronologically based on when the messages were created, where the message for the async check-in element 710 is from 2 days ago, the message from the async check-in element 712 is from 3 days ago, and the message from the async check-in element is from 1 week ago.

In one or more embodiments, the async check-in elements 710-714 represent or reflect asynchronous messages left by co-users relating to a particular content item, project, content collection, or group of co-users. That is, the async check-in elements 710-714 represent messages recorded or created by co-users whenever the co-users were logged in (e.g., in the content management system 106 or the creativity web browser) to engage with the content item of the digital canvas 704 (or some other content item, project, collection, or group). Relatedly, the creative browser system 102 can generate and provide different async check-in panes for different content items, projects, content collections, or groups of co-users. For instance, the creative browser system 102 can provide options to switch between the different async check-in panes for a user account. In some implementations, the creative browser system 102 provides an async check-in pane pertaining the content item displayed within the digital canvas 704 as a default async check-in pane (and provides options to switch to other async check-in panes).

In some cases, the creative browser system 102 receives a selection of the async check-in element 710. In response, the creative browser system 102 plays the audio message left by User B. In addition, the creative browser system 102 can receive a selection of the async check-in element 712, whereupon the creative browser system 102 expands the async check-in element 712 or opens a message window to present the entire text message left by User C. Further, the creative browser system 102 can receive a selection of the async check-in element 714, whereupon the creative browser system 102 opens or provides a video window 716 to play the video message left by User D. For instance, the creative browser system 102 provides the video window 716 to present a larger version of the video message, along with tools and options to manage playback of the video. In some embodiments, the creative browser system 102 plays (and provides tools to manage) the video message directly within the async check-in element 714 of the async check-in pane 706.

In one or more embodiments, the creative browser system 102 plays multiple messages from the async check-pane 706 automatically (e.g., without user interaction selecting and playing each message). For example, the creative browser system 102 provides a play-all option within the async check-in pane 706 to play each of the messages within the async check-in pane 706 from top to bottom (e.g., in chronological or reverse chronological order). Indeed, the creative browser system 102 can generate an audio version of each message in the async check-in pane 706 and can play the audio as a digestible update for a user account, one message after the other.

In some cases, a user account receives many messages or async check-ins, and the creative browser system 102 selects a subset of the async check-ins to play for the user account. For instance, the creative browser system 102 utilizes a message importance machine learning model (e.g., a neural network) to determine an importance score for an async check-in. Specifically, the creative browser system 102 generates importance scores by utilizing the message importance machine learning model to analyze or process information such as: i) historical user interactions with content items pertaining to async check-ins, ii) historical user interactions with co-user accounts who create async check-ins, iii) historical user interactions with async check-in elements, iv) relationships between the user account and co-user accounts who create async check-ins, and/or v) membership within certain collaborative teams with co-users who create async check-ins. In some cases, the creative browser system 102 selects only those async check-ins that satisfy a threshold importance score to play for the user account. In these or other cases, the creative browser system 102 ranks the async check-ins by importance score and selects a top number of async check-ins to play for the user account.

Figure 8:
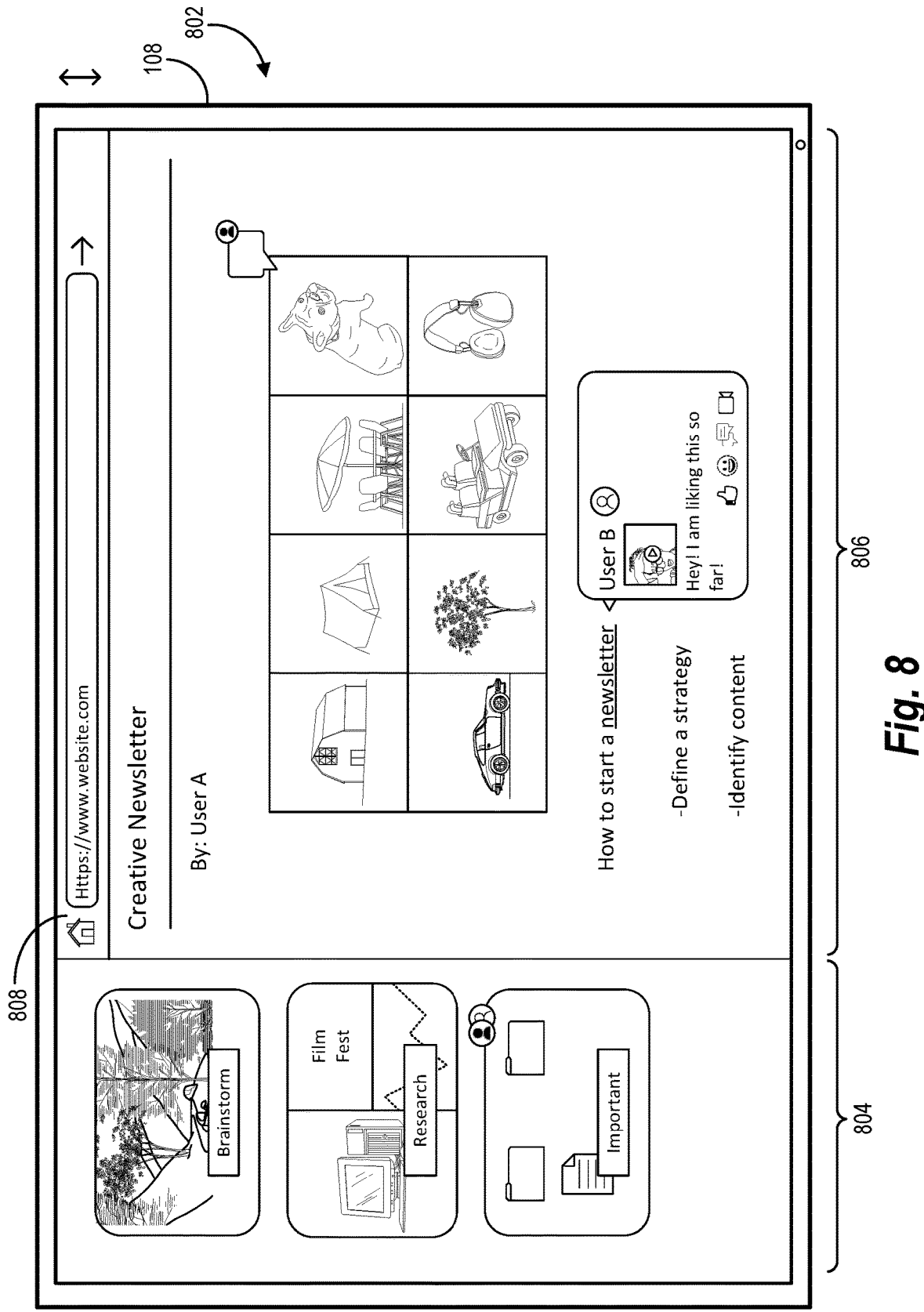
FIG. 8 illustrates an example web browser interface including a content collection pane, a digital canvas, and a vanishing address bar in accordance with one or more embodiments.

As mentioned above, in certain described embodiments, the creative browser system 102 provides an address bar for navigating among different websites or other content items. In particular, the creative browser system 102 provides an address bar for navigating based on entry of web addresses or uniform resource locators ("URLs"). FIG. 8 illustrates an example user interface including an address bar in accordance with one or more embodiments.

As illustrated in FIG. 8, the client device 108 displays a web browser interface 802 that includes a digital canvas 806 and a content collection pane 804. In addition, the web browser interface 802 includes a vanishing address bar 808. To elaborate, in a default state of the web browser interface 802, the creative browser system 102 refrains from providing or presenting the address bar 808 (and/or the content collection pane 804), instead providing the digital canvas 806 unobscured by other interface elements. Based on user interaction requesting the address bar 808 (e.g., the selection of an option or the hovering of a cursor at a pixel location where the address bar 808 will appear and for a threshold duration) or based on determining otherwise that the address bar 808 is needed, the creative browser system 102 provides the address bar 808 for display within the web browser interface 802. The creative browser system 102 can also remove the address bar 808 upon navigation to an entered content item displayed in the digital canvas 806. Indeed, as indicated by the two-sided arrow to the right of the client device 108, the creative browser system 102 can dynamically present and remove the address bar 808.

Figure 9:
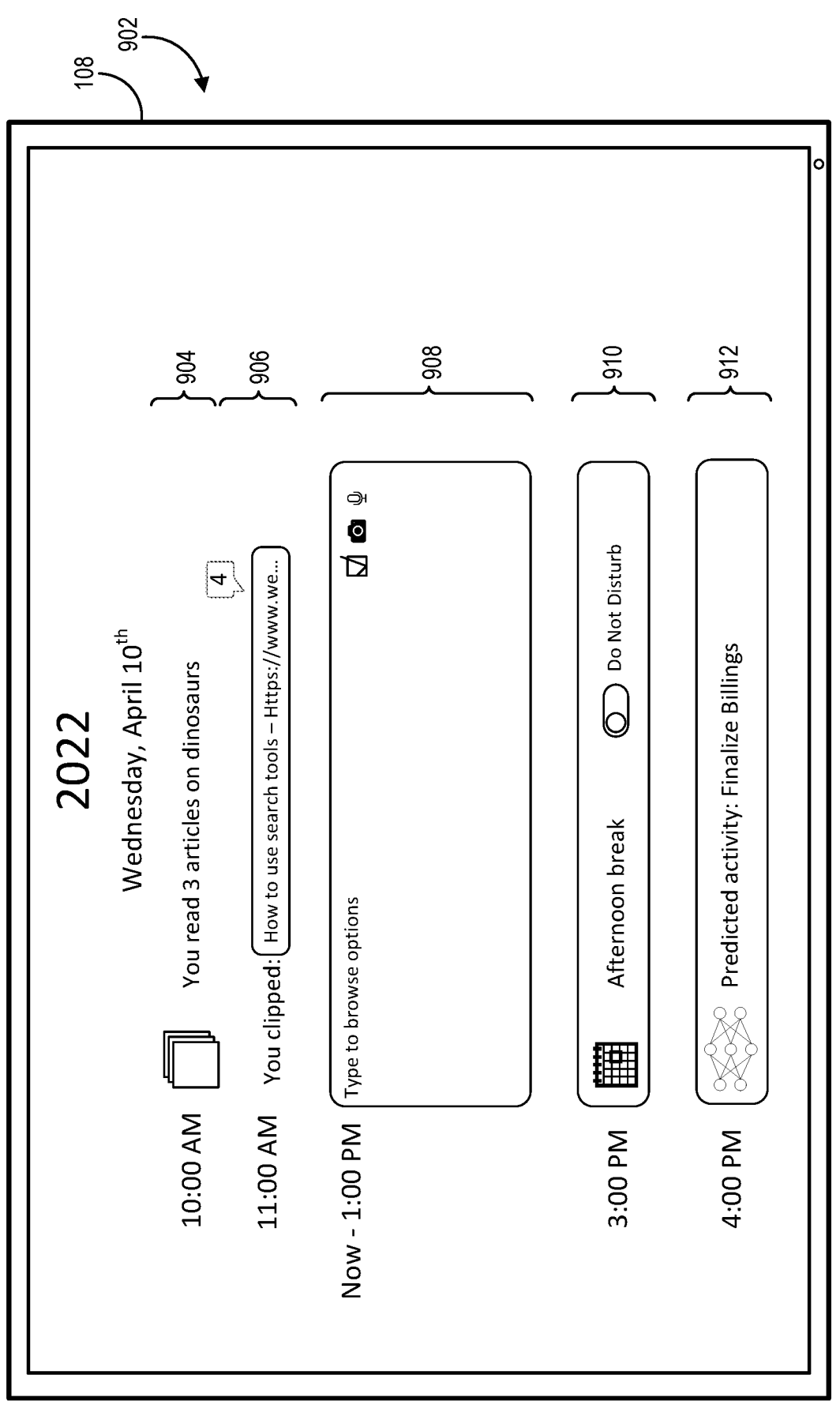
FIG. 9 illustrates an example web browser interface including a timeline homepage in accordance with one or more embodiments.

As further mentioned above, in certain embodiments, the creative browser system 102 generates and provides a timeline homepage associated with a user account. In particular, the creative browser system 102 provides a timeline homepage as a default content item displayed within a digital canvas upon starting a new session within the creativity web browser and/or upon opening a new tab or a new window within the digital canvas. FIG. 9 illustrates an example timeline homepage in accordance with one or more embodiments.

As illustrated in FIG. 9, the client device 108 displays a web browser interface 902 that includes or depicts a timeline homepage laying out a chronology of activity associated with the user account of the client device 108. In some cases, the creative browser system 102 assigns each user in the content management system 106 their own timeline homepage, complete with a web address for viewing a timeline of activities specific to the user account. For example, the timeline homepage includes or depicts a previous activity portion depicting historical internet activity (e.g., the prior activity 904 and the prior activity 906) associated with the user account, a present activity portion that includes an interactive input panel 908 for generating digital content, and a future activity portion depicting upcoming activity associated with the user account (e.g., the future activity 910 and the future activity 912). As shown, the creative browser system 102 divides the timeline homepage, separating the previous activity portion from the future activity portion, by placing the interactive input panel 908 centrally between the prior activities 904-906 and the future activities 910-912.

As shown, the creative browser system 102 determines and provides the prior activity 904 for display within the web browser interface 902. In particular, the creative browser system 102 determines the prior activity 904 indicating that the user account read three articles about dinosaurs at 10:00 am. Indeed, in some cases, the creative browser system 102 groups prior activities together to generate and provide a grouped prior activity such as the prior activity 904 (indicating a general time or an average time or a start time when the articles were read). In certain embodiments, however, the creative browser system 102 provides individual, granular prior activities indicating each article and the specific time (e.g., the hour and minute) the article was read.

In addition, the creative browser system 102 determines and provides the prior activity 906 for display within the web browser interface 902. In particular, the creative browser system 102 determines that the user account clipped a content item at 11:00 am (e.g., from a website or another content item). The creative browser system 102 further provides a comment indicator notifying the user that there are four co-user comments relating to the clipped content item (or the content item from which the clip was taken). In some embodiments, the comment indicator is selectable to expand or otherwise present the co-user comments (e.g., text comments, audio comments, or video comments). In these or other embodiments, the creative browser system 102 can also communicate with the co-users via the comment indicator. Additionally, the creative browser system 102 can provide presence indicators indicating presence of co-user accounts within content items of the prior activities 904-906 and/or the future activities 910-912.

As further illustrated in FIG. 9, the creative browser system 102 provides the interactive input panel 908 for display within the timeline homepage. Within the interactive input panel 908, the creative browser system 102 provides interactive options for creating digital content, such as text box for typing a to-do list or some other digital document, or for creating a digital video or a digital audio clip. In some cases, the creative browser system 102 provides suggested or recommended content items within the interactive input panel 908. For instance, based on typing of one or more characters, the creative browser system 102 determines and presents content cards for content items associated with the typed characters and the user account (e.g., within the content management system 106 or the internet), such as previously viewed content items or content items within a particular collection or associated with a particular project or collaborative group of co-users.

As further illustrated in FIG. 9, the creative browser system 102 determines and provides a future activity 910 within the timeline homepage. For instance, the creative browser system 102 analyzes a digital calendar associated with the user account and identifies an upcoming afternoon break at 3:00 pm. The creative browser system 102 further determines settings (e.g., a do not disturb setting) associated with the afternoon break and indicates the settings within the interface element for the future activity 910. As another example, the creative browser system 102 determines an upcoming content item from a to-do list or a task list associated with the user account.

Additionally, the creative browser system 102 can generate and provide the future activity 912 within the timeline homepage. For example, the creative browser system 102 can determine or generate a predicted activity (and its predicted time) associated with the user account. In some embodiments, the creative browser system 102 generates or predicts a predicted activity by determining a browser journey associated with a user account. More specifically, the creative browser system 102 determines a browser journey from a starting activity that initiates the browser journey to an ending activity that terminates the browser journey. For example, the creative browser system 102 determines, as a browser journey, a set or a sequence of activities within the content management system 106 and/or the internet to accomplish a particular result, such as creation of a content item or sharing of a content item (e.g., posting via a social media feed). Indeed, based on detecting a particular initial activity by a user account, the creative browser system 102 predicts an end result (or a final activity) for the initial activity and a browser journey required to achieve the predicted result. In certain embodiments, a browser journey spans multiple application sessions (e.g., sessions within the content management system 106 and/or the creativity web browser).

In some cases, the creative browser system 102 generates a browser journey by predicting activities that a user account will perform (e.g., based on historical behavior of the user account and/or co-user accounts). For example, the creative browser system 102 utilizes an activity prediction machine learning model (e.g., a neural network) to generate a sequence of predicted activities that form a browser journey. Indeed, based on an initial activity, the creative browser system 102 predicts a next activity using an activity prediction model trained to predict next activities based on historical activity of the user account and/or co-user accounts.

In some cases, the creative browser system 102 determines which activities in a browser journey have already been performed (e.g., from the same application session or previous application sessions) and which have not to then determine and provide the future activity 912 as the next activity in the browser journey. In one or more embodiments, the creative browser system 102 further provides a selectable option to perform (or to navigate to a content item for performing) a predicted activity. For example, the creative browser system 102 provides a selectable option within the timeline homepage or within a digital canvas or some other interface element. In certain implementations, the creative browser system 102 provides the selectable option to perform a predicted activity based on detecting that the user account initiates a new application session after previously logging off (e.g., to continue the browser journey where the user account left off in the last session). Additional detail regarding predicting user activities and training an activity prediction machine learning model is provided hereafter with reference to subsequent figures. As shown, the creative browser system 102 predicts that the user account will access a content item to finalize billings at 4:00 pm.

In one or more embodiments, the creative browser system 102 generates or determines more prior activities and/or future activities than displayed within the web browser interface 902 at a time. The creative browser system 102 can enable user interaction to scroll through prior activities and future activities within the timeline homepage. In some cases, the creative browser system 102 scrolls all of the interface elements together as though fixed relative to one another. In other cases, the creative browser system 102 fixes the interactive input panel 908 in place within the timeline homepage and scrolls the prior activities and the future activities behind the interactive input panel 908 (e.g., to emphasize that the interactive input panel 908 indicates a present activity). In some embodiments, either when scrolling or still, the creative browser system 102 can gray out prior activities and future activities to visually differentiate them from the interactive input panel 908.

Figure 10:
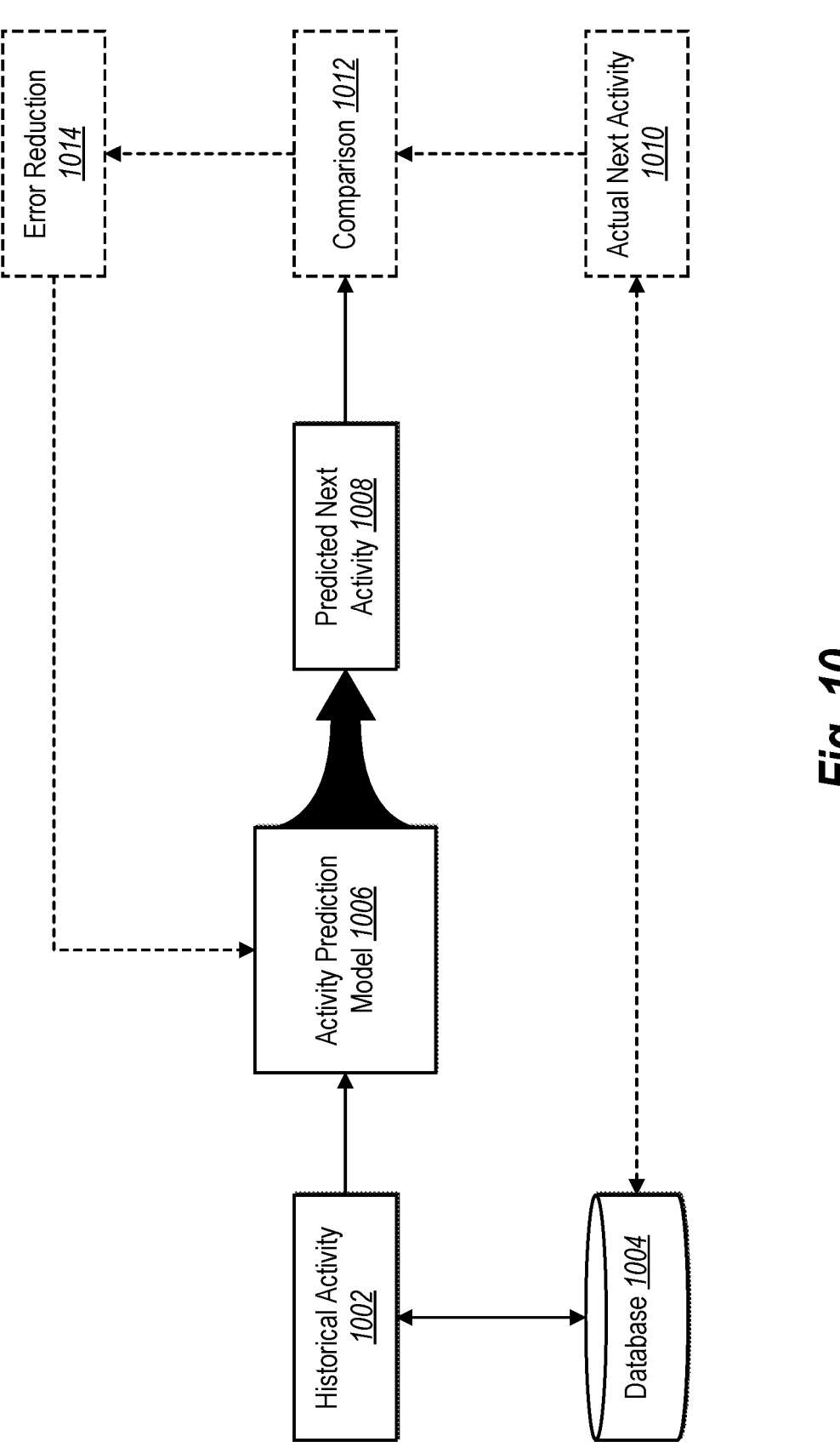
FIG. 10 illustrates an example diagram for training and implementing an activity prediction model in accordance with one or more embodiments.

As mentioned, in certain described embodiments, the creative browser system 102 can generate a browser journey by predicting activities for a user account. In particular, the creative browser system 102 utilizes an activity prediction machine learning model to generate predicted activities for a browser journey. FIG. 10 illustrates an example flow for training and implementing an activity prediction model in accordance with one or more embodiments.

As illustrated in FIG. 10, the creative browser system 102 identifies a historical activity 1002. For instance, the creative browser system 102 accesses the historical activity 1002 from the database 1004 (e.g., the database 114) or detects the historical activity 1002 performed by a user account (e.g., within the content management system 106 or the creativity web browser). In addition, the creative browser system 102 provides the historical activity 1002 to the activity prediction model 1006, whereupon the activity prediction model 1006 generates a predicted next activity 1008 from the historical activity 1002. In particular, the activity prediction model 1006 generates the predicted next activity 1008 according to its internal parameters such as weights and biases.

To generate the predicted next activity 1008 accurately, the creative browser system 102 can train the activity prediction model 1006. More specifically, the creative browser system 102 trains the activity prediction model 1006 by modifying, updating, or tuning its internal parameters such as weights and biases that affect how the activity prediction model 1006 processes data. For instance, in the case of training the activity prediction model 1006, the creative browser system 102 performs a comparison 1012 of the predicted next activity 1008 with an actual next activity 1010 (as stored in the database 1004 and indicated to be the actual activity performed after the historical activity 1002). In some cases, such as cases where the activity prediction model 1006 is a neural network, the creative browser system 102 performs the comparison 1012 by utilizing a loss function such as cross entropy loss or mean square error loss. Additionally, based on the comparison 1012, the creative browser system 102 performs an error reduction 1014 (e.g., a back propagation in the case of a neural network) to modify or update the internal parameters of the activity prediction model 1006 to reduce a measure of loss or otherwise improve the prediction accuracy of the activity prediction model 1006. The creative browser system 102 can repeat the training process until the activity prediction model 1006 generates predicted next activities with at least a threshold measure of accuracy and/or until the comparison 1012 yields a measure of loss that satisfies a threshold.

Figure 11:
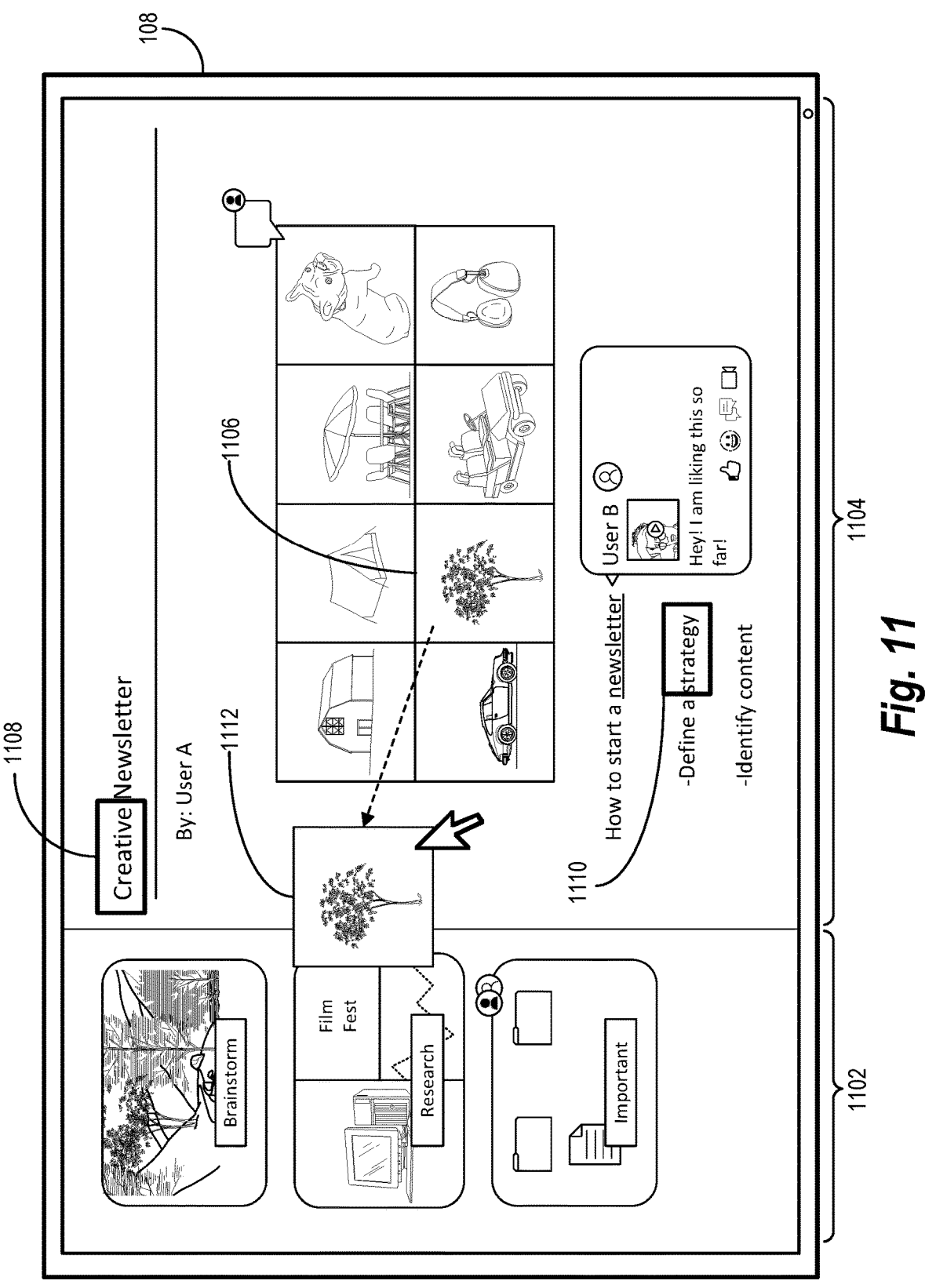
FIG. 11 illustrates an example of generating and moving content items from clips in accordance with one or more embodiments.

As mentioned above, in certain described embodiments, the creative browser system 102 generates content items in the form of clips taken from other content items. In particular, the creative browser system 102 generates content items from sub-portions or selections of a content item. Indeed, the creative browser system 102 provides content items for display to facilitate generating new content items from clips of any selectable piece or part of the content items. FIG. 11 illustrates an example depiction of generating content items from clips in accordance with one or more embodiments.

As illustrated in FIG. 11, the client device 108 displays a web browser interface that includes a content collection pane 1102 and digital canvas 1104. Within the digital canvas 1104, the creative browser system 102 provides a content item (e.g., the aforementioned "Creative Newsletter" website) for display. In addition, the creative browser system 102 receives an indication of a user selection of a sub-portion of the content item, such as a selection of a digital image 1106, a word 1108 from a header or title, or a word 1110 from the body of the content item. Indeed, the creative browser system 102 can discretize a content item into many constituent content items (e.g., clips) comprised of small components, pieces, or chunks of content from the content item. In response to the user selection of the digital image 1106, for instance, the creative browser system 102 generates clip 1112 as a new content item. As shown, the creative browser system 102 also receives a user interaction (e.g., a click and drag) to add the clip 1112 to a content collection within the content collection pane 1102.

In some cases, the creative browser system 102 generates the clip 1112 upon selection of the digital image 1106. In other cases, the creative browser system 102 generates the clip 1112 upon detecting a drag gesture away to move the (would-be) clip 1112 away from the digital image 1106. In still other cases, the creative browser system 102 provides a visual representation of the clip 1112 based on user interaction selecting and/or dragging the digital image 1106, but the creative browser system 102 only generates the actual content item for storage in the content management system 106 upon detecting a release or a drop of the visual representation into a content collection (e.g., within the content collection pane 1102). Similarly, the creative browser system 102 can generate content items from clips from the word 1108, the word 1110, or some other piece of digital content within the "Creative Newsletter" website displayed in the digital canvas 1104.

Figure 12:
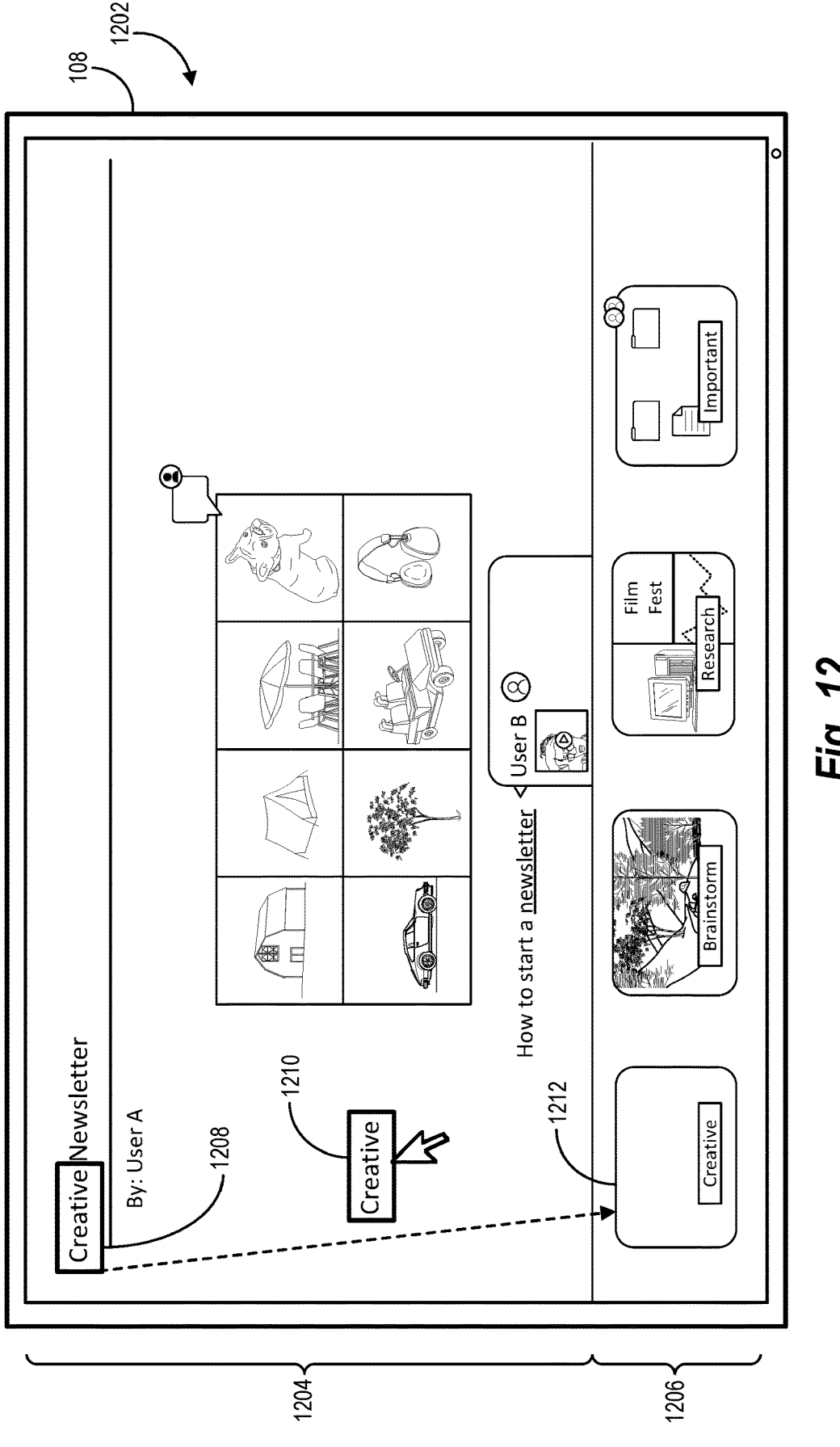
FIG. 12 illustrates an example web browser interface including a digital canvas and a floating content collection banner in accordance with one or more embodiments.

As mentioned above, in certain described embodiments, the creative browser system 102 generates and provides a content collection banner within a web browser interface. In particular, the creative browser system 102 provides a floating content collection banner that is moveable and manipulable by a user for quick, efficient management of content items within content collections. FIG. 12 illustrates an example content collection banner in accordance with one or more embodiments.

As illustrated in FIG. 12, the client device 108 displays a digital canvas 1204 and a content collection banner 1206. Within the digital canvas 1204, the creative browser system 102 receives or detects a selection of a word 1208, and the creative browser system 102 generates a clip 1210 from the selected word 1208. Further, the creative browser system 102 adds the clip 1210 to a content collection 1212 within the content collection banner 1206.

In some embodiments, the creative browser system 102 displays the content collection banner 1206 in a different location within the web browser interface 1202. For example, the content collection banner 1206 can float over the digital canvas 1204 and can be moveable to different locations. In some cases, the creative browser system 102 receives user interaction to move (or resize or change to a vertical orientation rather than horizontal) the content collection banner 1206 to float over a different portion of the digital canvas 1204, such as over the middle of the digital canvas 1204, on the right side of the digital canvas 1204, or on the top of the digital canvas 1204. The creative browser system 102 provides or manages the content collection banner 1206 with the same functions as described in relation to a content collection pane.

Figure 13:
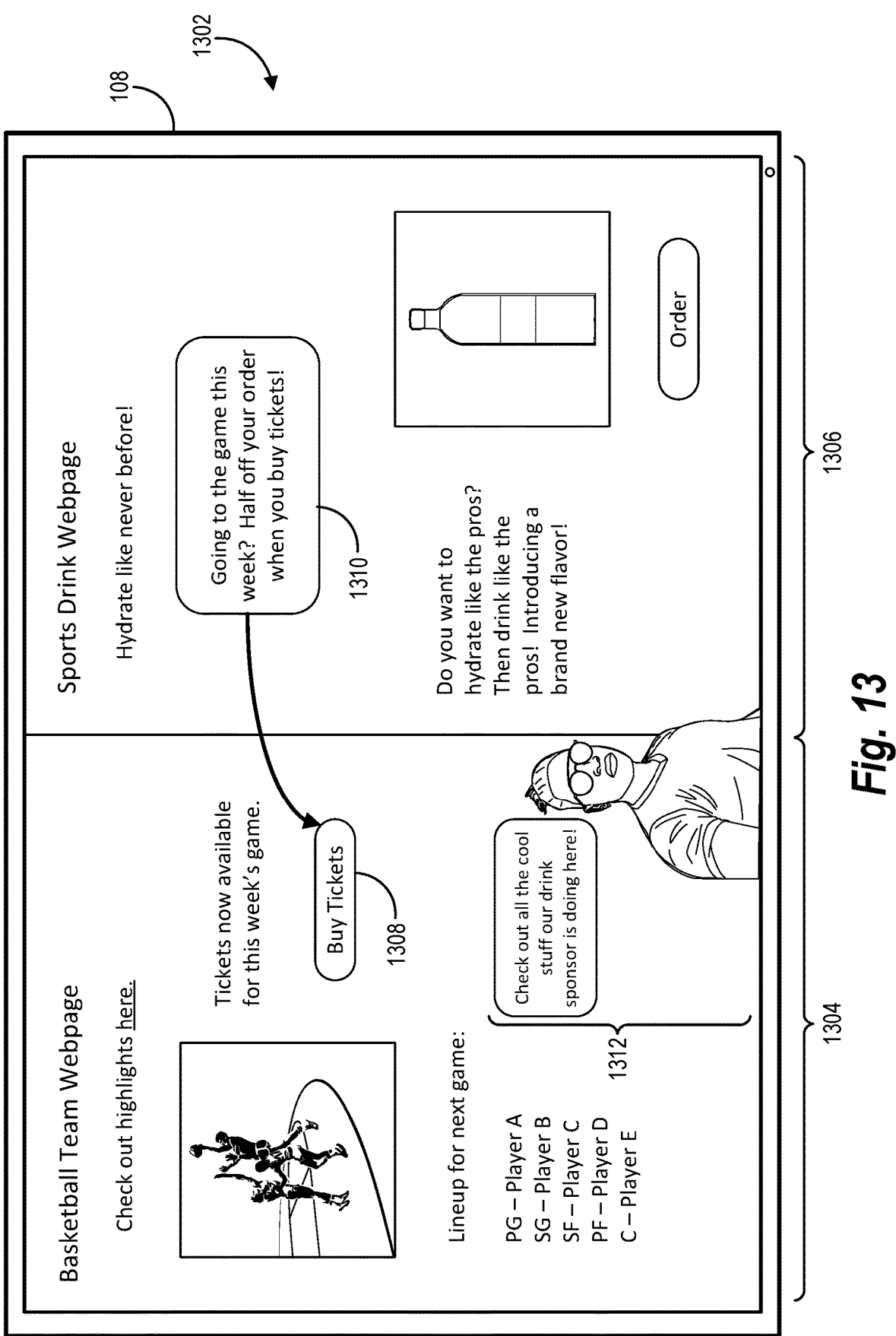
FIG. 13 illustrates an example web browser interface including visual interactions between two webpages in accordance with one or more embodiments.

As mentioned above, in one or more embodiments, the creative browser system 102 provides multiple websites for display together within a digital canvas or within separate digital canvases of a single web browser interface. In particular, the creative browser system 102 provides multiple websites that have a relationship between them that causes the creative browser system 102 to provide a visual interaction between the websites. FIG. 13 illustrates an example visual interaction between two websites in accordance with one or more embodiments.

As illustrated in FIG. 13, the client device 108 displays a web browser interface 1302 with a first webpage 1304 (or a first digital canvas) and a second webpage 1306 (or a second digital canvas). The first webpage 1304 depicts a "Basketball Team Webpage" with highlights, a player lineup for the next game, and a purchase option 1308 to buy tickets. The second webpage 1306 depicts a "Sports Drink Webpage" that includes advertising content, an image of a drink, and an option to order from the website.

In some embodiments, the creative browser system 102 determines a relationship between the first webpage 1304 and the second webpage 1306. For example, the creative browser system 102 determines that one or both of the webpages includes code or metadata that indicates a relationship with the other. As another example, the creative browser system 102 determines that the webpages are related by determining business relationships, subject matter similarities, commonality within a shared browser journey (e.g., where one webpage is for generating a digital video and another is for sharing the digital video), commonality within a shared content collection, commonality among co-user accounts that access the webpages, or some other relationship.

In addition, the creative browser system 102 generates visual interactions based on the relationship between the first webpage 1304 and the second webpage 1306. In certain cases, the creative browser system 102 determines or generates the visual interaction as defined by code or metadata within one or both webpages. In other cases, the creative browser system 102 generates a visual interaction based on the relationship between the webpages, such as content depicted within the webpages, a shared browser journey (e.g., to provide a visualization showing how to move a video created in one webpage to a social media feed in the other webpage), or some other information. For instance, the creative browser system 102 generates and provides a visual interaction 1310 and a visual interaction 1312 for display within the web browser interface 1302.

As shown, the visual interaction 1310 indicates that if the user account buys tickets to the game (via the purchase option 1308), then the second webpage 1306 will provide a half off discount a sports drink order. In addition, the visual interaction 1312 indicates that the company or product depicted in the second webpage 1306 is a sponsor of the basketball team depicted in the first webpage 1304. In some embodiments, the creative browser system 102 facilitates an awareness between webpages where, upon adding the second webpage 1306 for display with the first webpage 1304, the creative browser system 102 modifies the webpages (or the webpages provide versions of their code) to depict visual interactions.

While FIG. 13 depicts visual interactions between two webpages, the creative browser system 102 can also provide visual interactions between other types of content items displayed together. For instance, the creative browser system 102 determines a relationship between two content items (simultaneously) such as documents, images, or videos displayed together in a single web browser interface. Based on the relationship, the creative browser system 102 provides a visual interaction between the content items, such as an indication that a digital image depicts objects that relate to a digital document. In some cases, the creative browser system 102 enables dragging and dropping content (e.g., clips) from one content item (e.g., website) to another based on the relationship between the content items. For instance, the creative browser system 102 determines that two content items belong to a common content collection, and the creative browser system 102 therefore facilitates dragging clips from one content item to the other.

In certain cases, the creative browser system 102 determines a relationship between a first content item in a first digital canvas tab and a second content item in a second digital canvas tab not displayed together but nevertheless simultaneously open and available to view (e.g., by toggling between the tabs). The creative browser system 102 can further provide visual interactions between the two content items open in different tabs or digital canvases (e.g., "We see you are also viewing our sponsor's page in another tab. Here's a discount on your next purchase!").

Figure 14:
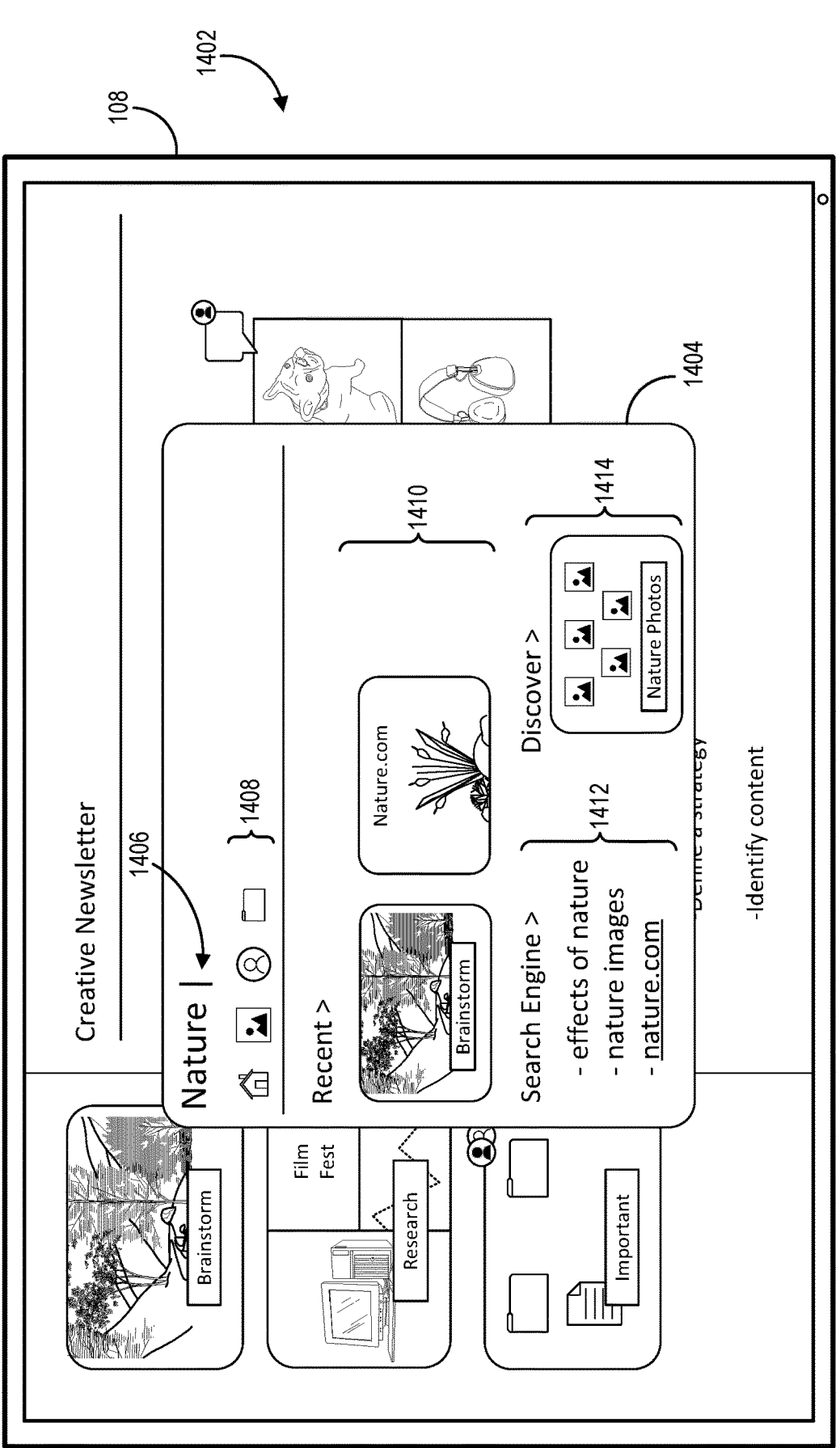
FIG. 14 illustrates an example web browser interface including a universal search element in accordance with one or more embodiments.

In one or more embodiments, the creative browser system 102 can provide a universal search element within a web browser interface. In particular, rather than providing a browser search only for internet content as is common in prior systems, the creative browser system 102 is integrated with the content management system 106 and can therefore provide a universal search element for searching content items on the internet and within the content management system 106. FIG. 14 illustrates a universal search element in accordance with one or more embodiments.

As illustrated in FIG. 14, the client device 108 displays a web browser interface 1402 that includes a universal search element 1404. Within the universal search element 1404, the creative browser system 102 receives a search query 1406. In response to the search query 1406, the creative browser system 102 generates query results and provides the query results for display within the universal search element 1404. In addition, the creative browser system 102 provides a search context menu 1408 that includes selectable options to indicate where the creative browser system 102 should narrow its search. For example, the search context menu includes a home option to search everywhere, an images option to search only images, a user account option to search only content items associated with the user account (e.g., within the content management system 106), a folders option to search only folders in the content management system 106 and/or other options to provide context for a search.

As shown, the creative browser system 102 generates search results for the search query 1406, "Nature." For instance, the creative browser system 102 generates search results that include different types of content items that the creative browser system 102 visually separates for easy user interpretation. Specifically, the creative browser system 102 identifies recent content items 1410 that include content cards for content items (e.g., the Nature.com website) and/or content collections (e.g., the "Brainstorm" collection) that the user account was visited within a threshold recency (e.g., within the previous day or the previous week). The content cards are selectable to view the corresponding content within a digital canvas. In some cases, the creative browser system 102 also provides presence indicators of co-user accounts within the universal search element 1404 (e.g., in relation to the content cards of the recent content items 1410) to indicate co-users that are currently viewing content items within the search results.

As further illustrated in FIG. 14, the creative browser system 102 provides search engine results 1412 as part of the overall search results. More specifically, the creative browser system 102 searches the internet using a search engine to obtain a number of internet results and/or to provide a number of similar searches based on the search query 1406 (e.g., "effects of nature" or "nature images"). Based on user selection of one of the options within the search engine results 1412, the creative browser system 102 provides the query to a search engine and displays results within the universal search element 1404 (or within a digital canvas).

Additionally, the creative browser system 102 provides a discover result 1414 within the universal search element

1404. For example, based on the search query 1406, the creative browser system 102 identifies or generates a collection of content items (e.g., from the content management system 106 and/or from the internet) and provides a content card for the collection ("Nature Photos"). In some cases, the discover result 1414 includes content items that the user account has not previously visited or viewed. Thus, the creative browser system 102 facilitates discovery or exploration of new content items related to the search query 1406.

The components of the creative browser system 102 can include software, hardware, or both. For example, the components of the creative browser system 102 can include one or more instructions stored on a computer-readable storage medium and executable by processors of one or more computing devices. When executed by one or more processors, the computer-executable instructions of the creative browser system 102 can cause a computing device to perform the methods described herein. Alternatively, the components of the creative browser system 102 can comprise hardware, such as a special purpose processing device to perform a certain function or group of functions. Additionally or alternatively, the components of the creative browser system 102 can include a combination of computer-executable instructions and hardware.

Furthermore, the components of the creative browser system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the creative browser system 102 may be implemented as part of a stand-alone application on a personal computing device or a mobile device.

FIGS. 1-14, the corresponding text, and the examples provide a number of different systems and methods for generating and providing a creativity web browser integrated with a content management system. In addition to the foregoing, implementations can also be described in terms of flowcharts comprising acts steps in a method for accomplishing a particular result. For example, FIG. 15 illustrates an example series of acts for generating and providing a creativity web browser integrated with a content management system.

Figure 15:
FIG. 15 illustrates a flowchart of a series of acts of generating and providing a creativity web browser in accordance with one or more embodiments.

While FIG. 15 illustrates acts according to certain implementations, alternative implementations may omit, add to, reorder, and/or modify any of the acts shown in FIG. 15. The acts of FIG. 15 can be performed as part of a method. Alternatively, a non-transitory computer readable medium can comprise instructions, that when executed by one or more processors, cause a computing device to perform the acts of FIG. 15. In still further implementations, a system can perform the acts of FIG. 15.

As illustrated in FIG. 15, the series of acts 1500 may include an act 1510 of generating a web browser interface including a digital canvas. In particular, the act 1510 can involve generating, for display on a client device, a web browser interface including a digital canvas displaying at least one content item. The act 1510 can include generating the digital canvas by: generating, for display within the digital canvas, a content card representing the at least one content item, wherein the content card is moveable, resizable, and depicts a visual representation of the at least one content item; determining, based on detecting the at least one content item within the digital canvas, an additional content item corresponding to the at least one content item;

and providing, for display within the digital canvas, an additional content card representing the additional content item.

As further illustrated in FIG. 15, the series of acts 1500 includes an act 1520 of providing a content collection pane within the web browser interface. In particular, the act 1520 can involve providing, for display within the web browser interface, a content collection pane overlaying a portion of the digital canvas and including interactive content cards representing respective content collections displayable within the digital canvas.

Additionally, the series of acts 1500 includes an act 1530 of receiving a selection of a content collection from the content collection pane. In particular, the act 1530 can involve receiving, from the client device, a user interaction selecting a content collection from the content collection pane of the web browser interface.

As further illustrated, the series of acts 1500 includes an act 1540 of accessing content items from a content management system. In particular, the act 1540 can include, in response to the user interaction selecting the content collection within the web browser interface, access one or more content items from the content collection within the content management system.

Further, the series of acts 1500 includes an act 1550 of providing content item(s) for display within the digital canvas. In particular, the act 1550 can involve in response to the user interaction selecting the content collection, providing one or more content items from the content collection for display within the digital canvas of the web browser interface.

In some embodiments, the series of acts 1500 includes an act of providing, for display within the web browser interface, an x-ray pane presenting insight data corresponding to the at least one content item displayed within the digital canvas, wherein the insight data includes one or more of content creation information indicating a creator account for the at least one content item, a comment from another client device related to the at least one content item, or a link to a website related to the at least one content item. In these or other embodiments, the series of acts 1500 includes an act of generating, for display within the web browser interface, a timeline homepage comprising a visual representation of a chronology of past internet activity, present internet activity, and future internet activity. The timeline homepage can include a previous activity portion depicting historical internet activity associated with a user account of the client device, a present activity portion comprising an interactive input panel for generating digital content, and a future activity portion depicting upcoming activity associated with the user account.

In certain embodiments, the series of acts 1500 includes an act of receiving an indication of user interaction selecting a portion of the at least one content item. In addition, the series of acts 1500 includes an act of generating a new content item from the portion of the at least one content item. Further, the series of acts 1500 includes an act of generating a manipulable item element for the new content item for display within the web browser interface. In some cases, the series of acts 1500 includes an act of receiving a comment from another client device relating to the at least one content item displayed within the digital canvas of the web browser interface. In these or other cases, the series of acts 1500 includes an act of providing the comment for display within the web browser interface on the client device in relation to the at least one content item.

The series of acts 1500 can include an act of identifying presence of a co-browser viewing the at least one content item on a different client device and an act of providing, for display within the web browser interface on the client device, a co-presence indicator reflecting presence of the co-browser viewing the at least one content item. Generating the co-presence indicator can involve generating the co-presence indicator to include a selectable option for communicating with the co-browser by one or more of text communication, audio communication, or video communication.

In one or more implementations, the series of acts 1500 includes an act of identifying a plurality of content items associated with a user account of a content management system. The series of acts 1500 can also involve generating a set of content collections for the plurality of content items associated with the user account within the content management system based on content item data for the plurality of content items. In some cases, the series of acts 1500 includes an act of providing the set of content collections for display within the content collection pane of the web browser interface.

The series of acts 1500 can include an act of determining, based on historical activity associated with a user account of the client device, a browser journey comprising a series of related web browser activities for the user account. The series of acts 1500 can also include an act of generating a predicted activity for user account to perform within the web browser interface as part of the browser journey. In some cases, the series of acts 1500 includes an act of identifying, within the web browser interface, a predicted content item associated with the predicted activity for the user account to perform as part of the browser journey, and further includes an act of provide, for display within the web browser interface in relation to the predicted content item, a journey activity element selectable for performing the predicted activity.

In certain implementations, the series of acts 1500 includes an act of receiving an indication of user interaction adding the at least one content item to a content collection associated with a user account of the client device. Additionally, the series of acts 1500 can include an act of, in response to the user interaction adding the at least one content item to the content collection, automatically posting the at least one content item to a social media feed associated with the user account. The series of acts 1500 can also include an act of determining a plurality of websites associated with the at least one content item displayed within the digital canvas of the web browser interface. Further, the series of acts 1500 can include an act of providing visual representations of the plurality of websites for display within the web browser interface for browsing by relevance to the at least one content item.

The series of acts 1500 can include an act of providing, for display within the web browser interface overlaying a portion of the digital canvas, a floating content collection banner for adding content items to respective content collections. The series of acts 1500 can also include an act of adding a content item to a content collection based on receiving an indication of user interaction adding the content item to the content collection displayed within the floating content collection banner.

Additionally, the series of acts 1500 can include an act of providing a first webpage and a second webpage for display together within the digital canvas of the web browser interface. Further, the series of acts 1500 can include an act of determining a relationship between the first webpage and the second webpage. In addition, the series of acts 1500 can include an act of generating, based on the relationship, a visual interaction between the first webpage and the second webpage for display within the web browser interface on the client device. The series of acts 1500 can further include an act of providing, for display in relation to the at least one content item within the digital canvas of the web browser interface, a selectable element for performing a suggested activity associated with the at least one content item. The series of acts 1500 can also include acts of generating a content collection comprising content items associated with a user account within a content management system and further comprising links to one or more websites and providing a visual representation of the content collection for display within the content collection pane of the web browser interface.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 16:
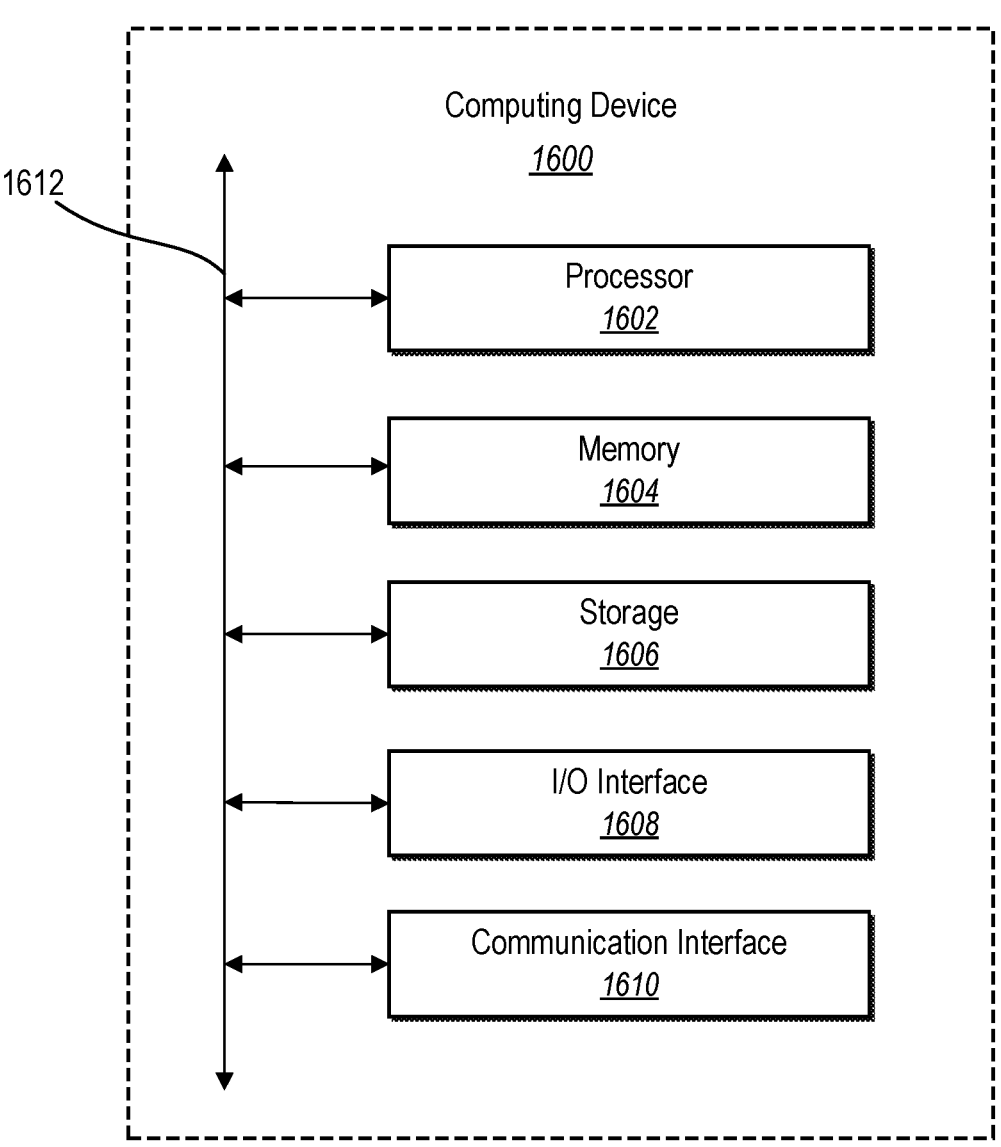
FIG. 16 illustrates a block diagram of an exemplary computing device in accordance with one or more embodiments.

FIG. 16 illustrates a block diagram of exemplary computing device 1600 (e.g., the server(s) 104 and/or the client device 108) that may be configured to perform one or more of the processes described above. One will appreciate that server(s) 104 and/or the client device 108 may comprise one or more computing devices such as computing device 1600. As shown by FIG. 16, computing device 1600 can comprise processor 1602, memory 1604, storage device 1606, I/O interface 1608, and communication interface 1610, which may be communicatively coupled by way of communication infrastructure 1612. While an exemplary computing device 1600 is shown in FIG. 16, the components illustrated in FIG. 16 are not intended to be limiting. Additional or alternative components may be used in other implementations. Furthermore, in certain implementations, computing device 1600 can include fewer components than those shown in FIG. 16. Components of computing device 1600 shown in FIG. 16 will now be described in additional detail.

In particular implementations, processor 1602 includes hardware for executing instructions, such as those making up a computer program. As an example and not by way of limitation, to execute instructions, processor 1602 may retrieve (or fetch) the instructions from an internal register, an internal cache, memory 1604, or storage device 1606 and decode and execute them. In particular implementations, processor 1602 may include one or more internal caches for data, instructions, or addresses. As an example and not by way of limitation, processor 1602 may include one or more instruction caches, one or more data caches, and one or more translation lookaside buffers (TLBs). Instructions in the instruction caches may be copies of instructions in memory 1604 or storage device 1606.

Memory 1604 may be used for storing data, metadata, and programs for execution by the processor(s). Memory 1604 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1604 may be internal or distributed memory.

Storage device 1606 includes storage for storing data or instructions. As an example and not by way of limitation, storage device 1606 can comprise a non-transitory storage medium described above. Storage device 1606 may include a hard disk drive (HDD), a floppy disk drive, flash memory, an optical disc, a magneto-optical disc, magnetic tape, or a Universal Serial Bus (USB) drive or a combination of two or more of these. Storage device 1606 may include removable or non-removable (or fixed) media, where appropriate. Storage device 1606 may be internal or external to computing device 1600. In particular implementations, storage device 1606 is non-volatile, solid-state memory. In other implementations, Storage device 1606 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1608 allows a user to provide input to, receive output from, and otherwise transfer data to and receive data from computing device 1600. I/O interface 1608 may include a mouse, a keypad or a keyboard, a touch screen, a camera, an optical scanner, network interface, modem, other known I/O devices or a combination of such I/O interfaces. I/O interface 1608 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1608 is configured to provide graphical data to a display for presentation to a user. The graphical data may be representative of one or more graphical user interfaces and/or any other graphical content as may serve a particular implementation.

Communication interface 1610 can include hardware, software, or both. In any event, communication interface 1610 can provide one or more interfaces for communication (such as, for example, packet-based communication) between computing device 1600 and one or more other computing devices or networks. As an example and not by way of limitation, communication interface 1610 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1610 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1610 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1610 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1612 may include hardware, software, or both that couples components of computing device 1600 to each other. As an example and not by way of limitation, communication infrastructure 1612 may include an Accelerated Graphics Port (AGP) or other graphics bus, an Enhanced Industry Standard Architecture (EISA)

bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 17:
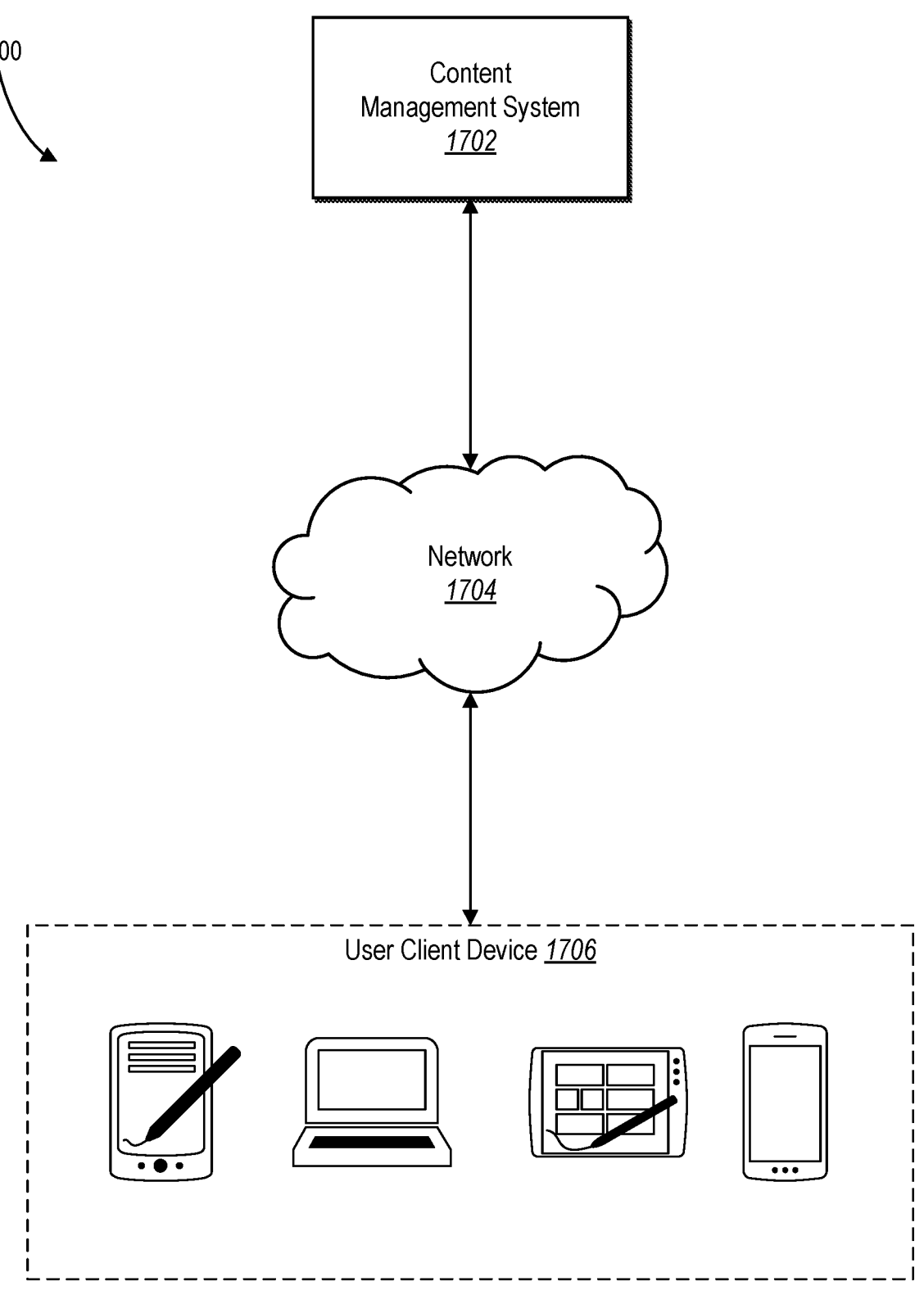
FIG. 17 illustrates an example environment of a networking system having the creative browser system in accordance with one or more embodiments.

FIG. 17 is a schematic diagram illustrating environment 1700 within which one or more implementations of the creative browser system 102 can be implemented. For example, the creative browser system 102 may be part of a content management system 1702 (e.g., the content management system 106). Content management system 1702 may generate, store, manage, receive, and send digital content (such as digital content items). For example, content management system 1702 may send and receive digital content to and from client devices 1706 by way of network 1704. In particular, content management system 1702 can store and manage a collection of digital content. Content management system 1702 can manage the sharing of digital content between computing devices associated with a plurality of users. For instance, content management system 1702 can facilitate a user sharing a digital content with another user of content management system 1702.

In particular, content management system 1702 can manage synchronizing digital content across multiple client devices 1706 associated with one or more users. For example, a user may edit digital content using client device 1706. The content management system 1702 can cause client device 1706 to send the edited digital content to content management system 1702. Content management system 1702 then synchronizes the edited digital content on one or more additional computing devices.

In addition to synchronizing digital content across multiple devices, one or more implementations of content management system 1702 can provide an efficient storage option for users that have large collections of digital content. For example, content management system 1702 can store a collection of digital content on content management system 1702, while the client device 1706 only stores reduced-sized versions of the digital content. A user can navigate and browse the reduced-sized versions (e.g., a thumbnail of a digital image) of the digital content on client device 1706. In particular, one way in which a user can experience digital content is to browse the reduced-sized versions of the digital content on client device 1706.

Another way in which a user can experience digital content is to select a reduced-size version of digital content to request the full- or high-resolution version of digital content from content management system 1702. In particular, upon a user selecting a reduced-sized version of digital content, client device 1706 sends a request to content management system 1702 requesting the digital content associated with the reduced-sized version of the digital content. Content management system 1702 can respond to the request by sending the digital content to client device 1706. Client device 1706, upon receiving the digital content, can then present the digital content to the user. In this way, a user can have access to large collections of digital content while minimizing the amount of resources used on client device 1706.

Client device 1706 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1706 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1704.

Network 1704 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1706 may access content management system 1702.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

generating a browser journey comprising a sequence of activities, wherein generating the browser journey is based on historical activity associated with a user account, the historical activity comprising:

historical browsing activity data associated with the user account; and historical access activity data with respect to a content collection associated with the user account;

identifying a predicted activity to perform to accomplish the browser journey;

identifying, from the content collection associated with the user account, a predicted content item associated with the predicted activity, the predicted content item being a content item to support the predicted activity; and providing, for display within a web browser interface on a client device associated with the user account, a predicted activity element that references the predicted content item.

2. The computer-implemented method of claim 1, further comprising providing, for display within the web browser interface, a timeline homepage comprising a chronology of activity associated with the user account, the chronology of activity comprising:

a previous activity portion comprising one or more historical activity elements based on the historical browsing activity data; and a future activity portion comprising the predicted activity element that references the predicted content item.

3. The computer-implemented method of claim 1, wherein generating the browser journey comprises utilizing an activity prediction machine learning model to generate the sequence of activities that form the browser journey.

4. The computer-implemented method of claim 1, further comprising:

determining an initial activity within the sequence of activities is complete; and wherein identifying the predicted activity comprises determining that the predicted activity is a next activity after the initial activity within the sequence of activities.

5. The computer-implemented method of claim 1, further comprising:

identifying a final activity within the sequence of activities of the browser journey; and removing the predicted activity element from display within the web browser interface based on determining the final activity is complete.

6. The computer-implemented method of claim 1, further comprising:

receiving, from the client device associated with the user account, an indication of a user interaction with the predicted activity element; and providing, to the client device, the predicted content item in response to the indication of the user interaction with the predicted activity element.

7. The computer-implemented method of claim 1, further comprising:

determining that the predicted activity is complete based on detecting additional access activity data with respect to the predicted content item; and identifying an additional predicted activity within the sequence of activities of the browser journey; and providing, for display within the web browser interface on the client device associated with the user account, an additional predicted activity element corresponding to the additional predicted activity.

8. A system comprising:

at least one processor; and a non-transitory computer readable medium comprising instructions that, when executed by the at least one processor, cause the system to:

identify an initial activity associated with a user account;

generate, based on the initial activity, a browser journey comprising a sequence of activities, wherein generating the browser journey is based on historical activity data associated with the user account;

identify a predicted activity within the sequence of activities, the predicted activity coming later within the sequence of activities with respect to the initial activity;

identify, from a content collection associated with the user account, a predicted content item associated with the predicted activity; and provide, for display within a web browser interface on a client device associated with the user account, a predicted activity element that references the predicted content item.

9. The system of claim 8, further comprising instructions that, when executed by the at least one processor, cause the system to:

determine the initial activity within the sequence of activities is complete; and wherein identifying the predicted activity comprises determining that the predicted activity is a next activity after the initial activity within the sequence of activities.

10. The system of claim 8, wherein generating the browser journey comprises utilizing an activity prediction machine learning model to generate the sequence of activities that form the browser journey based on providing the activity prediction machine learning model with data corresponding to the initial activity.

11. The system of claim 8, further comprising instructions that, when executed by the at least one processor, cause the system to:

provide the predicted activity element for display within a timeline homepage that includes a future activity portion depicting upcoming activity associated with the user account; and provide, within the timeline homepage, a scroll element with which a user can interact to scroll between the future activity portion and a prior activity portion.

12. The system of claim 8, further comprising instructions that, when executed by the at least one processor, cause the system to remove the predicted activity element from display within the web browser interface based on determining a final activity within the sequence of activities of the browser journey is complete.

13. The system of claim 12, further comprising instructions that, when executed by the at least one processor, cause the system to provide, to the client device, the predicted content item in response to an indication of a user interaction with the predicted activity element.

14. The system of claim 8, further comprising instructions that, when executed by the at least one processor, cause the system to:

identify an additional predicted activity within the sequence of activities of the browser journey; and provide, for display on the client device associated with the user account, an additional predicted activity element corresponding to the additional predicted activity based on determining that the predicted activity is complete.

15. A non-transitory computer readable medium comprising instructions that, when executed by at least one processor, cause the at least one processor to:

generate, based on a detecting an initial activity associated with a user account, a browser journey comprising a sequence of activities, wherein generating the browser journey is based on historical activity data associated with the user account;

identify a predicted activity within the sequence of activities, the predicted activity coming later within the sequence of activities with respect to the initial activity;

identify, from a content collection associated with the user account, a predicted content item associated with the predicted activity based on historical access activity data indicating that the predicted content item is affiliated with the predicted activity; and provide, for display on a client device associated with the user account, a predicted activity element that references the predicted content item.

16. The non-transitory computer readable medium of claim 15, wherein identifying the predicted activity comprises determining that the predicted activity is a next activity after the initial activity within the sequence of activities.

17. The non-transitory computer readable medium of claim 16, wherein generating the browser journey comprises utilizing an activity prediction machine learning model to generate the sequence of activities for the browser journey based on providing the activity prediction machine learning model with data corresponding to the initial activity.

18. The non-transitory computer readable medium of claim 16, further comprising instructions that, when executed by the at least one processor, cause the at least one processor to remove the predicted activity element from display on the client device based on determining the predicted activity is complete by detecting an update to the predicted content item.

19. The non-transitory computer readable medium of claim 15, further comprising instructions that, when executed by the at least one processor, cause the at least one processor to provide, to the client device, the predicted content item in response to an indication of a user interaction with the predicted activity element.

20. The non-transitory computer readable medium of claim 15, further comprising instructions that, when executed by the at least one processor, cause the at least one processor to:

identify an additional predicted activity within the sequence of activities of the browser journey; and provide, for display on the client device associated with the user account, an additional predicted activity element corresponding to the additional predicted activity.

* * * * *